US012094659B2

(12) United States Patent
Nishiura et al.

(10) Patent No.: US 12,094,659 B2
(45) Date of Patent: Sep. 17, 2024

(54) CERAMIC ELECTRONIC COMPONENT, CIRCUIT BOARD ARRANGEMENT, AND METHOD OF MANUFACTURING CERAMIC ELECTRONIC COMPONENT

(71) Applicant: TAIYO YUDEN CO., LTD., Tokyo (JP)

(72) Inventors: Shin Nishiura, Tokyo (JP); Jun Shibano, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 310 days.

(21) Appl. No.: 17/549,589

(22) Filed: Dec. 13, 2021

(65) Prior Publication Data

US 2022/0238278 A1  Jul. 28, 2022

(30) Foreign Application Priority Data

Jan. 27, 2021  (JP) ................................. 2021-011185

(51) Int. Cl.
*H01G 4/232* (2006.01)
*H01G 4/248* (2006.01)
*H01G 4/30* (2006.01)

(52) U.S. Cl.
CPC ........... *H01G 4/2325* (2013.01); *H01G 4/248* (2013.01); *H01G 4/30* (2013.01)

(58) Field of Classification Search
CPC ........ H01G 4/2325; H01G 4/248; H01G 4/30; H01G 4/232
See application file for complete search history.

(56) References Cited

U.S. PATENT DOCUMENTS

| 6,252,481 B1 * | 6/2001 | Iwao ..................... H01F 41/043 336/200 |
| 9,818,538 B2 * | 11/2017 | Kim ....................... H05K 1/181 |
| 10,366,834 B1 * | 7/2019 | Lee .......................... H01G 4/012 |
| 11,264,177 B2 * | 3/2022 | Saruban ................... H01G 4/12 |
| 11,735,366 B2 * | 8/2023 | Ikebe ................... H01G 4/0085 361/301.4 |
| 2001/0017420 A1 * | 8/2001 | Iwao ................... H01F 17/0013 257/693 |
| 2007/0063246 A1 * | 3/2007 | Lee .......................... H01G 4/30 257/303 |

(Continued)

FOREIGN PATENT DOCUMENTS

| CN | 1309400 A * | 8/2001 | ........... H01G 4/1209 |
| CN | 102549687 A * | 8/2012 | ............... H01G 4/12 |

(Continued)

OTHER PUBLICATIONS

KR20190116129_Original_Translation (Year: 2019).*
KR20180035169_Original_and_Translation (Year: 2018).*

*Primary Examiner* — Timothy J. Dole
*Assistant Examiner* — Muhammed Azam
(74) *Attorney, Agent, or Firm* — Stein IP LLC

(57) ABSTRACT

A ceramic electronic component has an element body having a dielectric and internal electrodes, and external electrodes formed on the element body. Each of the external electrodes has an electrical conductive layer connected to the internal electrodes. The electrical conductive layer has an outer side and an inner side. The outer side is farther from the element body than the inner side. The outer side includes more voids than the inner side.

22 Claims, 11 Drawing Sheets

(56) References Cited

U.S. PATENT DOCUMENTS

| | | | |
|---|---|---|---|
| 2007/0145449 A1* | 6/2007 | Sato | H01G 4/228 257/295 |
| 2009/0161293 A1* | 6/2009 | Takeuchi | H01G 4/005 361/321.2 |
| 2009/0237859 A1* | 9/2009 | Nakamura | H01G 4/33 156/89.12 |
| 2011/0141660 A1* | 6/2011 | Jeong | H01G 4/12 361/321.2 |
| 2012/0218678 A1* | 8/2012 | Satou | H01G 4/12 361/303 |
| 2013/0094121 A1* | 4/2013 | Endo | H01G 4/1209 361/305 |
| 2013/0208399 A1* | 8/2013 | Morita | H01G 4/30 361/301.4 |
| 2014/0301012 A1* | 10/2014 | Kim | H01G 4/1209 361/301.4 |
| 2016/0071647 A1 | 3/2016 | Nishisaka et al. | |
| 2017/0018363 A1* | 1/2017 | Tanaka | H01G 4/232 |
| 2017/0047163 A1* | 2/2017 | Tomizawa | H01G 4/232 |
| 2018/0061574 A1* | 3/2018 | Kitamura | H01G 4/258 |
| 2019/0355520 A1* | 11/2019 | Nakamura | H01G 4/012 |
| 2019/0385795 A1* | 12/2019 | Yang | H01G 4/30 |
| 2020/0211784 A1* | 7/2020 | Tamatani | H01G 9/07 |
| 2020/0365326 A1* | 11/2020 | Masunari | H01G 2/065 |
| 2021/0012964 A1* | 1/2021 | Lee | H01G 4/232 |
| 2021/0375549 A1* | 12/2021 | Okada | H01G 4/012 |
| 2022/0238278 A1* | 7/2022 | Nishiura | H01G 4/232 |
| 2022/0285097 A1* | 9/2022 | Iguchi | H01G 4/1209 |
| 2022/0285098 A1* | 9/2022 | Iguchi | H01G 4/30 |
| 2022/0293344 A1* | 9/2022 | Iguchi | H01G 4/1227 |
| 2022/0392709 A1* | 12/2022 | Nakahiro | H01G 4/12 |
| 2023/0386748 A1* | 11/2023 | Iguchi | H01G 4/30 |

FOREIGN PATENT DOCUMENTS

| | | | | |
|---|---|---|---|---|
| EP | 2874159 A2 | * | 5/2015 | C23C 4/08 |
| JP | 2016-058719 A | | 4/2016 | |
| KR | 20150135909 A | * | 12/2015 | |
| KR | 20190116130 A | * | 10/2019 | |
| KR | 20210006155 | * | 1/2021 | |

* cited by examiner

CERAMIC ELECTRONIC COMPONENT, CIRCUIT BOARD ARRANGEMENT, AND METHOD OF MANUFACTURING CERAMIC ELECTRONIC COMPONENT

TECHNICAL FIELD

The present invention relates to ceramic electronic components, circuit board arrangements, and methods of manufacturing ceramic electronic components.

RELATED ART

Multilayer ceramic capacitors are used in high frequency communication systems, such as mobile phones, for purposes, such as noise reduction. Applications of multilayer ceramic capacitors have been expanding to include automotive applications. Higher reliability for ceramic capacitors is necessary.

Patent document 1 discloses a technique of including an element that reacts with hydrogen to form a covalent hydride between a plating layer that is the outermost layer constituting an external electrode and a dielectric layer constituting a ceramic element body in order to reduce the effect of hydrogen generated in a plating process and to minimize degradation of insulation resistance.

Patent Document 1: JP-A-2016-58719

SUMMARY OF THE INVENTION

In the technology disclosed in Patent Document 1, certain types of elements could not be effective in preventing diffusion of hydrogen from the plating layer into the ceramic element body.

Accordingly, it is an object of the present invention to provide a ceramic electronic component, a circuit board arrangement, and a method of manufacturing a ceramic electronic component that can more effectively minimize diffusion of hydrogen into an element body.

According to one aspect of the present invention, there is provided a ceramic electronic component including an element body including a dielectric and internal electrodes; and external electrodes formed on the element body. Each of the external electrodes may include an electrical conductive layer connected to the internal electrodes, the electrical conductive layer having an outer side and an inner side, the outer side being farther from the element body than the inner side, the outer side having more voids than the inner side.

Each of the external electrodes may further include a plating layer formed outside the electrical conductive layer and containing Ni.

The voids in the electrical conductive layer may be located in a range from 0.1 μm to 3.0 μm from an outer surface of the electrical conductive layer in a thickness direction of the electrical conductive layer.

Each of the voids may have a length in a thickness direction of the electrical conductive layer and a length in a surface direction of the electrical conductive layer, and the length of the voids in the surface direction may be greater than the length of the voids in the thickness direction.

Each of the voids may have a length in a thickness direction of the electrical conductive layer and a length in a surface direction of the electrical conductive layer, and the electrical conductive layer may have more voids of which the length in the surface direction is greater than the length in the thickness direction than voids of which the length in surface directions is less than the length in the thickness direction.

The voids may have a longitudinal length in a longitudinal direction thereof, and the longitudinal length may be from 0.5 μm to 6.5 μm.

Each of the voids may have a length in a thickness direction of the electrical conductive layer and a length in a surface direction of the electrical conductive layer, and the electrical conductive layer may have voids of which the length in the surface direction is four times or more than the length in the thickness direction accounting for at least 50% of all of the voids in the electrical conductive layer.

The electrical conductive layer may have metal oxide portions, and the metal oxide portions may be disposed at positions inside the voids or being in contact with the voids.

The electrical conductive layer may include a base layer formed on the element body and connected to the internal electrodes, the base layer containing a conductor; and an innermost plating layer formed on the base layer, the innermost plating layer having an outer side and an inner side, the outer side of the innermost plating layer being farther from the element body than the inner side of the innermost plating layer, the outer side of the innermost plating layer having more voids than the inner side of the innermost plating layer.

A main component of a material of the innermost plating layer may be a metal selected from Cu, Fe, Zn, Sn, Pb, and Cr, or an alloy containing at least a metal selected from Cu, Fe, Zn, Sn, Pb, and Cr.

The main component of the material of the innermost plating layer may be Cu.

In this case, a main component of a material of the base layer of each of the external electrodes may be Ni. Each of the external electrodes may include a Ni plating layer formed outside the innermost plating layer and containing Ni; and a Sn plating layer formed on the Ni plating layer and containing Sn.

In another embodiment, the electrical conductive layer may include a base layer formed on the element body and connected to the internal electrodes. The base layer may have an outer side and an inner side, the outer side of the base layer being farther from the element body than the inner side of the base layer, the outer side of the base layer having more voids than the inner side of the base layer.

Furthermore, a main component of a material of the base layer of each of the external electrodes may be Cu. Each of the external electrodes may include a Ni plating layer formed outside the base layer and containing Ni; and a Sn plating layer formed on the Ni plating layer and containing Sn.

Each of the external electrodes may further include an electrical conductive resin layer formed on the electrical conductive layer.

In this case, the electrical conductive layer may include a base layer formed on the element body and connected to the internal electrodes, the base layer including Ni; and a Cu plating layer formed on the base layer, the Cu plating layer having an outer side and an inner side, the outer side of the Cu plating layer being farther from the element body than the inner side of the Cu plating layer, the outer side of the Cu plating layer having more voids than the inner side of the Cu plating layer. Each of the external electrodes may include a Ni plating layer formed on the electrical conductive resin layer and containing Ni; and a Sn plating layer formed on the Ni plating layer and containing Sn.

Alternatively, the electrical conductive layer may include a base layer formed on the element body and connected to the internal electrodes, the base layer containing Cu, the base layer having an outer side and an inner side, the outer side of the base layer being farther from the element body than the inner side of the base layer, the outer side of the base layer having more voids than the inner side of the base layer. Each of the external electrodes may include a Ni plating layer formed on the electrical conductive resin layer and containing Ni; and a Sn plating layer formed on the Ni plating layer and containing Sn.

According to another aspect of the present invention, there is provided a circuit board arrangement including a circuit board; and any of the above-described ceramic electronic component mounted on the circuit board. The ceramic electronic component may be connected to the circuit board via solder layers adhered to the external electrodes.

According to another aspect of the present invention, there is provided a method of manufacturing a ceramic electronic component. The method may include forming an element body that includes a dielectric and internal electrodes; forming electrical conductive layers on the element body, the electrical conductive layers being connected to the internal electrodes, each of the electrical conductive layers having an outer side and an inner side, the outer side being farther from the element body than the inner side, the outer side having more voids than the inner side; and forming a plating layer containing Ni outside each of the electrical conductive layers.

Forming the electrical conductive layers may include applying a base material for external electrodes to multiple surfaces of the element body, the base material containing a metal; sintering the base material to form base layers forming the electrical conductive layers of the external electrodes, each of the base layers having an outer side and an inner side; oxidizing the metal of the base layers to form metal oxide portions in the base layers in such a manner that the outer side of each of the base layers are exposed to an oxidizing atmosphere, so that the outer side has more metal oxide portions than the inner side; and forming voids in the base layer by removing metal oxide from the metal oxide portions.

Forming the electrical conductive layers may include forming base layers of the electrical conductive layers of the external electrodes; forming innermost plating layers on the base layers, the innermost plating layers containing a metal, each of the innermost plating layers having an outer side and an inner side; oxidizing the metal of the innermost plating layers to form metal oxide portions in the innermost plating layers in such a manner that the outer side of each of the innermost plating layers are exposed to an oxidizing atmosphere, so that the outer side has more metal oxide portions than the inner side; and forming voids in the innermost plating layer by removing metal oxide from the metal oxide portions.

DESCRIPTION OF EMBODIMENTS

Figure 1:
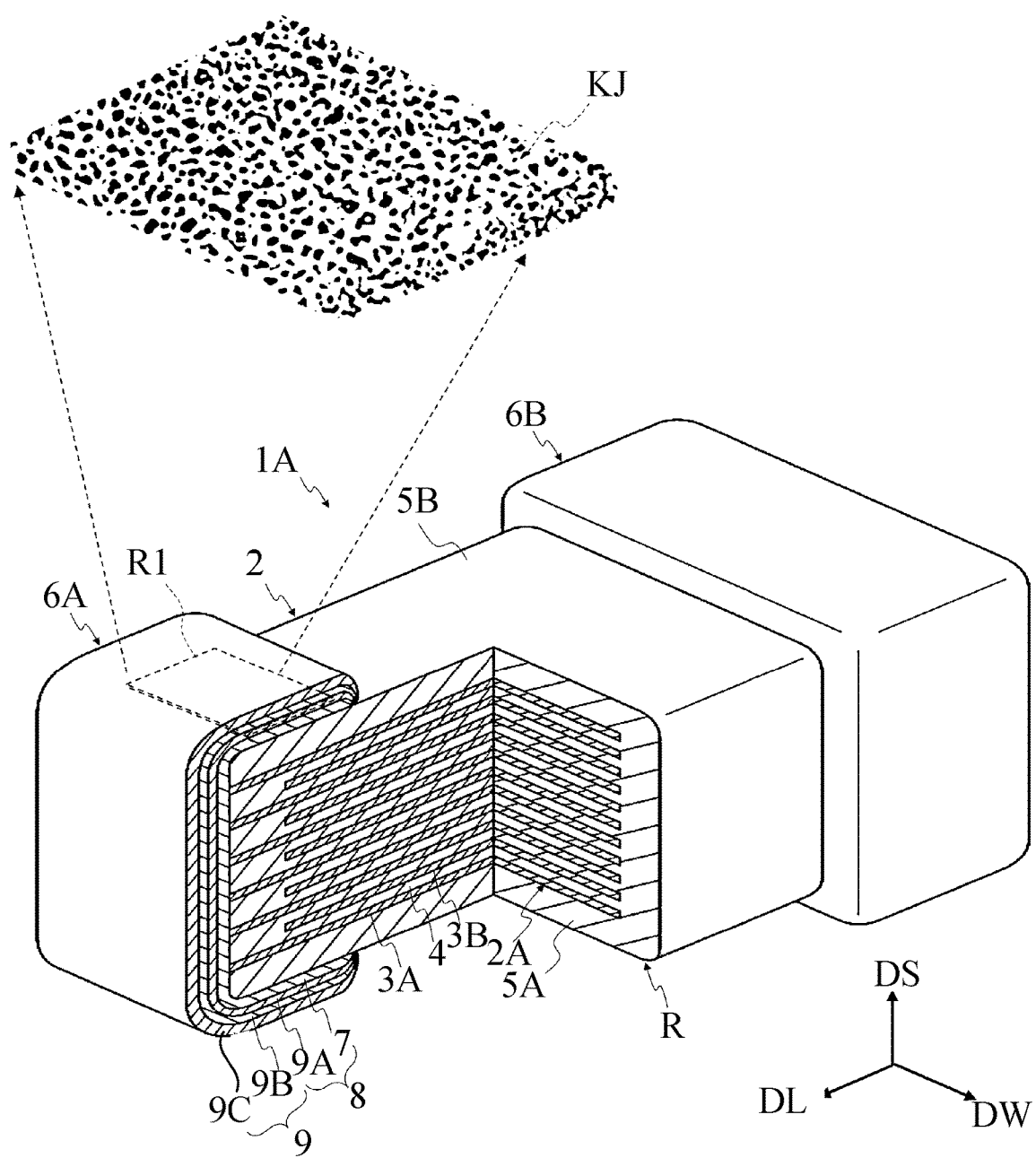
FIG. 1 is a perspective view showing a multilayer ceramic capacitor according to a first embodiment of the present invention.

Embodiments of the present invention will now be described with reference to the accompanying drawings. The following embodiments are not intended to limit the present invention. The combination of all the features described in each of the embodiments is not absolutely necessary for the present invention. The configuration of each embodiment may be modified and/or changed depending upon designs, specifications, and various conditions of an apparatus and a device to which the present invention is applied (use conditions, use environment, and the like). The technical scope of the invention is defined by the appended claims and is not limited by the following embodiments. Furthermore, parts, components, and elements shown in the drawings used in connection with the following description may be different from actual parts, components, and elements in the structure, scale, and shape for the sake of easier understanding of the parts, components, and elements.

First Embodiment

Figure 2A:
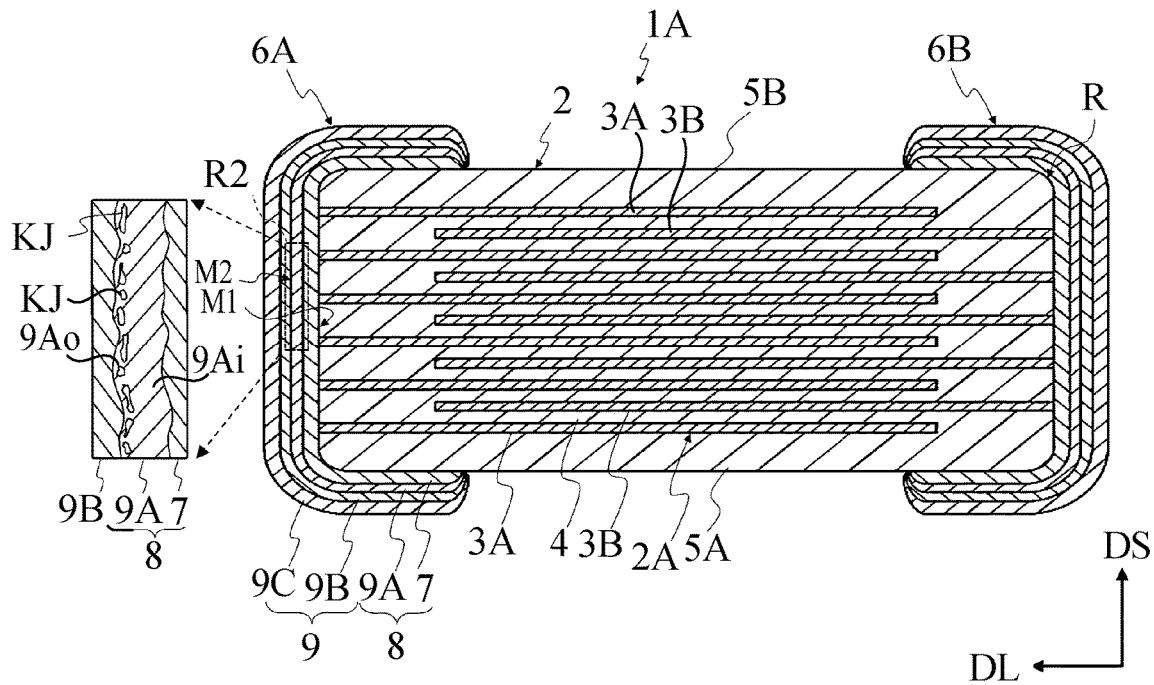
FIG. 2A is a cross-sectional view of the multilayer ceramic capacitor of FIG. 1 taken along the longitudinal direction thereof.

FIG. 1 is a perspective view showing a multilayer ceramic capacitor 1A according to a first embodiment of the present invention. FIG. 2A is a cross-sectional view of the multilayer ceramic capacitor 1A of FIG. 1 taken along the longitudinal direction thereof. In FIG. 1, an area R1 of an innermost plating layer 9A is shown in enlargement. In FIG. 2A, a cross sectional region R2 of an external electrode 6A is shown in enlargement. In this embodiment, a multilayer ceramic capacitor is taken as an example as a ceramic electronic component.

In FIGS. 1 and 2A, the multilayer ceramic capacitor 1A includes an element body (element assembly) 2 and external electrodes (outer electrodes) 6A and 6B. The element body 2 has a laminate (or stack) 2A, a lower cover layer 5A, and an upper cover layer 5B. The laminate 2A has internal electrode layers (inner electrode layers) 3A, other internal electrode layers 3B, and dielectric layers 4 interposed between neighboring internal electrode layers 3A and 3B.

The lowermost layer of the laminate 2A is covered with the lower cover layer 5A, and the uppermost layer of the laminate 2A is covered with the upper cover layer 5B. The internal electrode layers 3A and 3B are alternately stacked in such a manner that the dielectric layers 4 are interposed therebetween. Although FIGS. 1 and 2A show an example in which eleven internal electrode layers 3A and 3B are stacked, the number of stacked internal electrode layers 3A and 3B is not limited. The shape of the element body 2 may be a substantially rectangular parallelepiped shape, and the shape of the laminate 2A may also be a substantially rectangular parallelepiped shape.

In the following description, the direction perpendicularly passing through the two side surfaces of the element body 2 may be referred to as a longitudinal direction DL, the direction perpendicularly passing through the front and rear surfaces of the element body 2 may be referred to as a width direction DW, and the direction perpendicularly passing through the top and bottom surfaces of the element body 2 may be referred to as a stacking direction (height direction) DS. The lower surface of the element body 2 can face the mounting surface of a circuit board to which the multilayer ceramic capacitor 1A is mounted. The element body 2 may be chamfered along the respective edges of the element body 2. In this case, the element body 2 has curved surfaces R at the edges chamfered.

The external electrodes 6A and 6B are located on opposite sides of the element body 2, respectively, so that the external electrodes 6A and 6B are spaced apart (separated) from each other. Each of the external electrodes 6A and 6B continuously covers the top surface, the side surface, and the bottom surface of the element body 2. Each of the external electrodes 6A and 6B may also cover the front surface and the rear surface of the element body 2.

In the longitudinal direction DL, the internal electrode layers 3A and 3B are arranged alternately at different positions in the laminate 2A. The internal electrode layers 3A can be closer to the left side surface of the element body 2 than the internal electrode layers 3B, whereas the internal electrode layers 3B can be closer to the right side surface of the element body 2 than the internal electrode layers 3A. Left ends of the internal electrode layers 3A are exposed at the left ends of the dielectric layers 4 and at the left side surface in the longitudinal direction DL of the element body 2 and are connected to the external electrode 6A. Right ends of the internal electrode layers 3B are exposed at the right ends of the dielectric layers 4 and at the right side surface in the longitudinal direction DL of the element body 2 and are connected to the external electrode 6B.

On the other hand, in the width direction DW, which is perpendicular to the longitudinal direction DL perpendicularly passing through the two side surfaces of the element body 2, ends of the internal electrode layers 3A and 3B are covered with the dielectric material that forms the dielectric layers 4. In the width direction DW, both ends of the internal electrode layers 3A may be aligned with both ends of the internal electrode layers 3B.

The thickness of each of the internal electrode layers 3A, the internal electrode layers 3B, and the dielectric layers 4 in the stacking direction DS may be in a range from 0.05 µm to 5 µm for example, may be 0.3 µm.

The material of the internal electrode layers 3A and 3B may be a metal, for example, Cu (copper), Fe (iron), Zn (zinc), Al (aluminum), Sn (tin), Ni (nickel), Ti (titanium), Ag (silver), Au (gold), Pt (platinum), Pd (palladium), Ta (tantalum), or W (tungsten), or may be an alloy containing at least one of the metals.

The main component of the material of the dielectric layers 4 may be, for example, a ceramic material having a perovskite structure. The main component may be contained in a ratio of 50 at % or more. The ceramic material of the dielectric layers 4 may be, for example, barium titanate, strontium titanate, calcium titanate, magnesium titanate, barium strontium titanate, barium calcium titanate, calcium zirconate, barium zirconate, calcium titanate zirconate, or titanium oxide.

The main component of the material of the lower cover layer 5A and the upper cover layer 5B may be, for example, a ceramic material. The main component of the ceramic material of the lower cover layer 5A and the upper cover layer 5B may be the same as the main component of the ceramic material of the dielectric layers 4.

The thicknesses of the lower cover layer 5A and the upper cover layer 5B are preferably 5 µm or more and 30 µm or less.

The external electrode 6A is connected to the internal electrode layers 3A, whereas the external electrode 6B is connected to the internal electrode layers 3B.

Each of the external electrodes 6A and 6B has an electrical conductive layer 8 and a plating layer 9 that includes Ni. The conductive layer 8 has many voids KJ in such a manner that the outer side M2 farther from the element body 2 includes more voids KJ than the inner side M1 closer to the element body 2 as shown in the cross section of FIG. 2A. In other words, the voids KJ can be distributed non-uniformly in the single conductive layer 8. The inner side M1 is adjacent to the boundary between the conductive layer 8 and the element body 2, whereas the outer side M2 is adjacent to the boundary between the conductive layer 8 and the plating layer 9. The plating layer 9 is formed on the conductive layer 8. The conductive layer 8 has a base layer 7 and an innermost plating layer 9A having the outer side M2 in which more voids KJ are disposed. The plating layer 9 has an intermediate plating layer 9B including Ni and an outermost plating layer 9C that is solder-wettable.

The base layers 7 of the external electrodes 6A and 6B are formed on opposite surfaces of the element body 2 so as to be separated from each other in the longitudinal direction DL. Each of the base layers 7 continuously covers the top surface, the side surface, and the bottom surface of the element body 2. Each of the base layers 7 may also cover the front surface and the rear surface of the element body 2.

The electrical conductive material of the base layer 7 may be a metal, for example, Cu, Fe, Zn, Al, Ni, Pt, Pd, Ag, Au, and Sn, or may be an alloy containing at least one of the metals. The base layer 7 may further include co-material particles. Here, the term "particle" is meant to include not only an individual small particle, but also a block formed by a combination of multiple small particles after the sintering process, which will be described later. The co-material in the base layer 7 reduces the difference in thermal expansion coefficients of the element body 2 and the base layer 7 to alleviate thermal stress exerted in the base layer 7. The main component of the co-material is, for example, a ceramic component that is the same as the main component of the material of the dielectric layers 4. The base layer 7 may also include a glass component. The glass in the base layer 7 component can densify the base layer 7. The glass component may be, for example, an oxide of Ba (barium), Ca (calcium), Zn, Al, Si (silicon), Mg (magnesium), B (boron), or the like.

The base layer 7 is preferably composed of a sintered metal that was sintered after a metal paste (material of the base layer 7) is applied to the element body 2. This enables the base layer 7 to have a large thickness while ensuring the adhesiveness between the element body 2 and the base layer 7, and ensures the strength of external electrode 6A and 6B while ensuring the electrical conductivity of the external electrodes 6A and 6B connected to the internal electrode layers 3A and 3B. In a case in which the base layer 7 is sintered simultaneously with the element body 2, Ni is preferable for the main component of the material of the base layer 7. However, the base layer 7 may be formed by sintering the metal paste (material of the base layer 7) after the element body 2 is sintered.

An innermost plating layer 9A is formed on the base layer 7. Multiple voids KJ are provided in the innermost plating layer 9A and can be distributed over surface directions of the innermost plating layer 9A entirely. In cross sections as shown in FIG. 2A, each void KJ is surrounded by the material of the innermost plating layer 9A. The voids KJ may be distributed on the outer side 9Ao of the innermost plating layer 9A in a layered manner over surface directions entirely. The voids KJ in the innermost plating layer 9A can be provided in opposite sides for the element body 2. That is to say, the voids KJ can be provided on the two sides in the stacking direction DS, the two sides in the longitudinal direction DL, and the two sides in the width direction DW in FIG. 1. The outer side 9Ao of the innermost plating layer 9A is the farther side (i.e., the opposite side) from the element body 2, on which the intermediate plating layer 9B is formed. Accordingly, the void KJ may be provided not only on the two outer sides 9Ao in the longitudinal direction DL, but also on the two outer sides in the width direction DW, and on the two outer sides in the stacking direction DS. The conductive layer 8 may also include an oxide of the material of the conductive layer 8 disposed at positions inside the voids KJ or being in contact with the voids KJ.

Before the intermediate plating layer 9B is formed on the external surface of the innermost plating layer 9A, the metal contained in the innermost plating layer 9A is non-uniformly oxidized while exposing the external surface of the innermost plating layer 9A to an oxidizing atmosphere, and then, the oxide of the metal is removed, so that the voids KJ are formed on the outer side 9Ao of the innermost plating layer 9A. In order to non-uniformly oxidize the metal contained in the innermost plating layer 9A, the outer side 9Ao of the innermost plating layer 9A can be rapidly oxidized. The voids KJ can be distributed in a spongy or porous manner on the outer side 9Ao of the innermost plating layer 9A. That is, the outer side 9Ao includes more voids KJ than the inner side 9Ai in the innermost plating layer 9A.

The main component of the material of the innermost plating layer 9A can be a metal, for example, Cu, Fe, Zn, Sn, Pb, or Cr, or may be an alloy containing at least one of the metals. The innermost plating layer 9A is, for example, a Cu plating layer. The Cu plating layer 9A can improve the adhesion of the plating layer 9 to the base layer 7 and can ensure good electrical conductivity. In addition, by using a Cu plating layer as the innermost plating layer 9A, voids KJ can be formed easily on the outer side 9Ao of the innermost plating layer 9A.

The thickness of the innermost plating layer 9A is preferably from 2 μm to 15 μm. The voids KJ are preferably located in a range from 0.1 μm to 3.0 μm in the thickness direction from the external surface of the innermost plating layer 9A. It is preferable that the length of each void KJ in surface directions be greater than the length thereof in the thickness direction of the innermost plating layer 9A. In addition, it is preferable that the innermost plating layer 9A include more voids KJ of which the length in surface directions is greater than that in the thickness direction than voids KJ of which the length in surface directions is less than that in the thickness direction. The length of the voids KJ in the longitudinal direction thereof is preferably from 0.5 μm to 6.5 μm. It is preferable that, in the innermost plating layer 9A, voids KJ of which the length in surface directions is four times or more than the length in the thickness direction account for at least 50% of all of the voids KJ.

The intermediate plating layer 9B is formed on the innermost plating layer 9A. The intermediate plating layer 9B is, for example, a Ni plating layer. The Ni plating layer 9B can improve the heat resistance of the external electrode 6A and 6B during soldering.

The outermost plating layer 9C is formed on the intermediate plating layer 9A. The outermost plating layer 9C is, for example, a Sn plating layer. The Sn plating layer 9C can improve wettability of the solder for the plating layer 9.

In the embodiment, by providing voids KJ on the outer side 9Ao of the innermost plating layer 9A, diffusion of hydrogen generated when forming the intermediate plating layer 9B on the innermost plating layer 9A can be blocked by the voids KJ. Hydrogen diffuses from the intermediate plating layer 9B, but is unlikely to pass through the voids KJ in the innermost plating layer 9A, so that hydrogen is unlikely to reach the element body 2. Thus, it is possible to prevent the hydrogen generated when forming the intermediate plating layer 9B on the innermost plating layer 9A from diffusing into the element body 2, to reduce the hydrogen reduction at the dielectric layers 4 between the internal electrode layers 3A and 3B, and to minimize deterioration of electrical insulation of the dielectric layers 4.

In addition, by disposing the voids KJ in a range from 0.1 micrometers to 3.0 micrometers in the thickness direction from the external surface of the innermost plating layer 9A (more voids KJ are disposed in the outer side 9Ao of the innermost plating layer 9A than the inner side 9Ai), the diffusion of hydrogen can be effectively blocked at the positions of the voids KJ while restricting increase in the thickness of the external electrodes 6A and 6B. Since the concentration of hydrogen is higher in the outer side 9Ao near the intermediate plating layer 9B than the inner side 9Ai near the element body 2, the diffusion of hydrogen can be effectively reduced by arranging the voids KJ in the outer side 9Ao.

In addition, by making the length of the voids KJ in surface directions greater than the length thereof in the thickness direction of the innermost plating layer 9A, the diffusion of hydrogen from the side on the intermediate plating layer 9B to the element body 2 can be effectively blocked by the voids KJ.

Figure 2B:
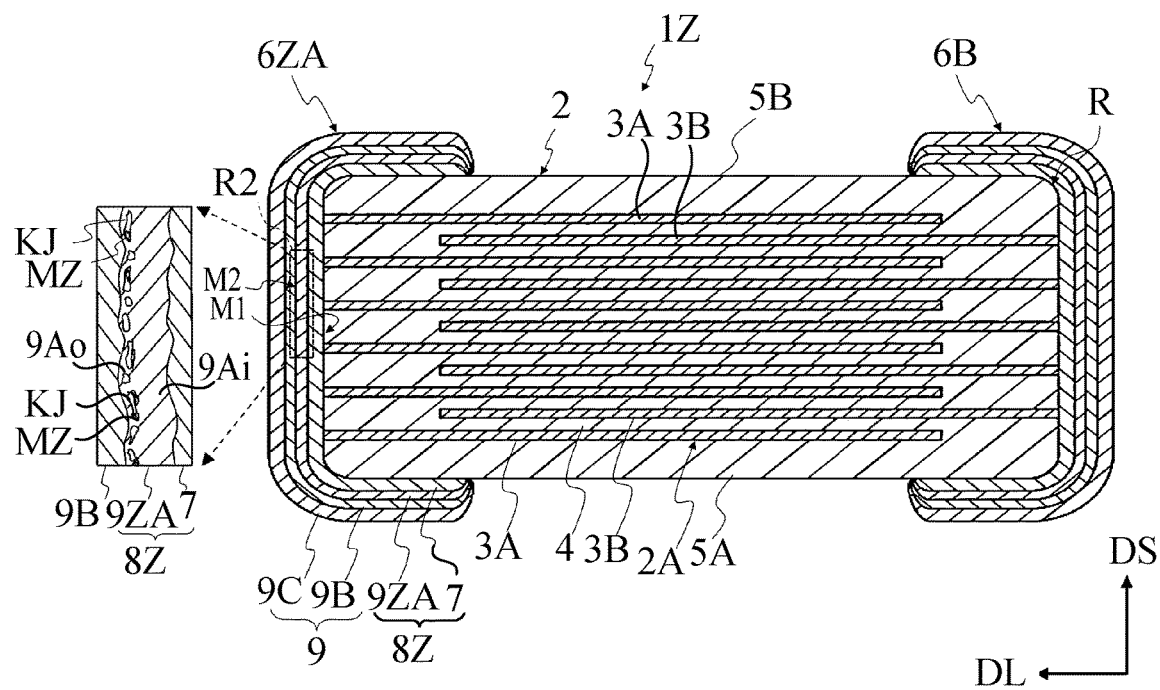
FIG. 2B is a cross-sectional view showing another example of the multilayer ceramic capacitor of FIG. 1 taken along the longitudinal direction thereof.

FIG. 2B is a cross-sectional view showing another example of the multilayer ceramic capacitor of FIG. 1 taken along the longitudinal direction thereof.

As shown in FIG. 2B, the multilayer ceramic capacitor 1Z has external electrodes 6ZA and 6ZB instead of the external electrodes 6A and 6B of the multilayer ceramic capacitor 1A of FIG. 2A. Each of the external electrodes 6ZA and 6ZB has an electrical conductive layer 8Z instead of the electrical conductive layer 8 in FIG. 2A. The conductive layer 8Z has an innermost plating layer 9ZA instead of the innermost plating layer 9A of FIG. 2A.

The innermost plating layer 9ZA has multiple voids KZ and multiple metal oxide portions MZ. Multiple voids KJ are provided in the innermost plating layer 9ZA and can be distributed over surface directions of the innermost plating layer 9ZA entirely. In cross sections as shown in FIG. 2B, each void KJ is surrounded by the material of the innermost plating layer 9ZA. The voids KJ may be distributed on the outer side 9Ao of the innermost plating layer 9ZA in a layered manner over surface directions entirely. The voids KJ in the innermost plating layer 9ZA can be provided in opposite sides for the element body 2. That is to say, the voids KJ can be provided on the two sides in the stacking direction DS, the two sides in the longitudinal direction DL, and the two sides in the width direction DW in FIG. 1.

The metal oxide portions MZ are formed of an oxide of a metal contained in the innermost plating layer 9ZA. For example, in a case in which the innermost plating layer 9ZA is made from Cu, the metal oxide portions MZ are made from CuO or $Cu_2O$. The metal oxide portions MZ are disposed at positions inside the voids KJ or being in contact with the voids KJ. The metal oxide portions MZ inside the voids KJ or in contact with the voids KJ captures hydrogen and further reduces diffusion of hydrogen into the element body 2.

Figure 3:
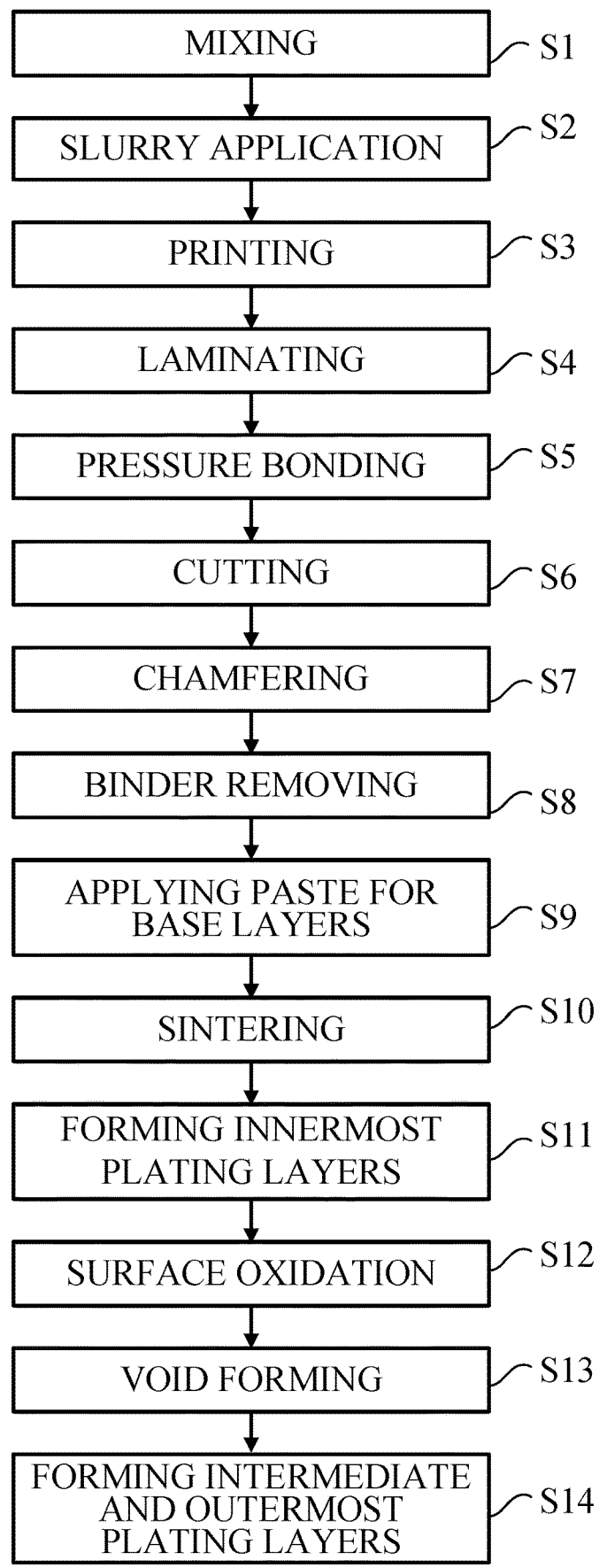
FIG. 3 is a flowchart showing a method of manufacturing a multilayer ceramic capacitor according to the first embodiment.

FIG. 3 is a flowchart showing a method of manufacturing a multilayer ceramic capacitor according to the first embodiment. FIGS. 4A to 4L are cross-sectional views showing an exemplary method of manufacturing the multilayer ceramic capacitor according to the first embodiment. For the sake of illustration, FIG. 4C to FIG. 4L show only three internal electrode layers 3A and three internal electrode layers 3B laminated alternately in such a manner that the dielectric layers 4 are interposed therebetween. In FIGS. 4I to 4K, a cross sectional region R2' of the conductive layer 8 is shown in enlargement. In FIG. 4L, a cross sectional region R2 of the external electrode 6A is shown in enlargement.

In Step S1 of FIG. 3 (mixing step), an organic binder and an organic solvent, as a dispersant and a forming aid, are added to a dielectric material powder, and pulverized and mixed to produce a muddy slurry. The dielectric material powder includes, for example, a ceramic powder. The dielectric material powder may include an additive or additives. The additive(s) may be, for example, Mg, Mn, V, Cr, Y, Sm, Eu, Gd, Tb, Dy, Ho, Er, Tm, Yb, Co, Ni, Li, B, Na, K or Si oxide, or glass. The organic binder is, for example, a polyvinyl butyral resin or a polyvinyl acetal resin. The organic solvent is, for example, ethanol or toluene.

Next, in Step S2 of FIG. 3 (slurry application step), as shown in FIG. 3A, a green sheet 24 is manufactured. Specifically, the slurry containing the ceramic powder is applied onto a carrier film in a sheet form and dried to manufacture the green sheet 24. The carrier film is, for example, a PET (polyethylene terephthalate) film. The application of the slurry can be conducted with the use of, for example, a doctor blade method, a die coater method, or a gravure coater method. Step S2 is repeated to prepare a plurality of green sheets 24.

Figure 4A:
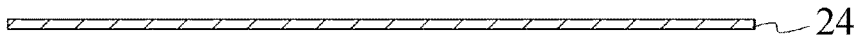
FIGS. 4A to 4L are cross-sectional views used for describing the method of manufacturing the multilayer ceramic capacitor according to the first embodiment.
Figure 4B:
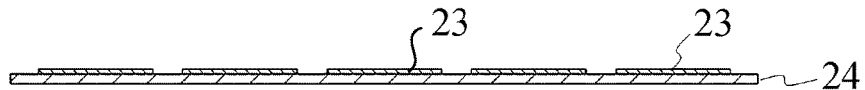

Next, in Step S3 of FIG. 3 (printing step), as shown in FIG. 4B, a conductive paste, which will become an internal electrode layer, is applied in a predetermined pattern onto each of the green sheets 24, on which internal electrode layers 3A or 3B shown in FIG. 1 are to be placed, among the green sheets prepared in Step S1 to form internal electrode patterns 23 on the green sheets 24. In Step S3, it is possible to form a plurality of internal electrode patterns 23 on each single green sheet 24 such that the internal electrode patterns 23 are separated from each other in the longitudinal direction of the green sheet 24.

The conductive paste for the internal electrode layers includes a powder of the metal used as the material of the internal electrode layers 3A and 3B. For example, if the metal used as the material of the internal electrode layers 3A and 3B is Ni, the conductive paste for the internal electrode layers includes a powder of Ni. The conductive paste for the internal electrode layers also includes a binder, a solvent, and, if necessary, an auxiliary agent. The conductive paste for the internal electrode layers may include, as a co-material, a ceramic material having a main component that has the same composition as that of the main component of the material of the dielectric layers 4.

The application of the conductive paste for the internal electrode layers may be conducted with the use of a screen printing method, an inkjet printing method, or a gravure printing method. Thus, Step S3 may be referred to as a printing step. In this manner, a plurality of green sheets 24 that have the internal electrode patterns 23 thereon are prepared.

Figure 4C:
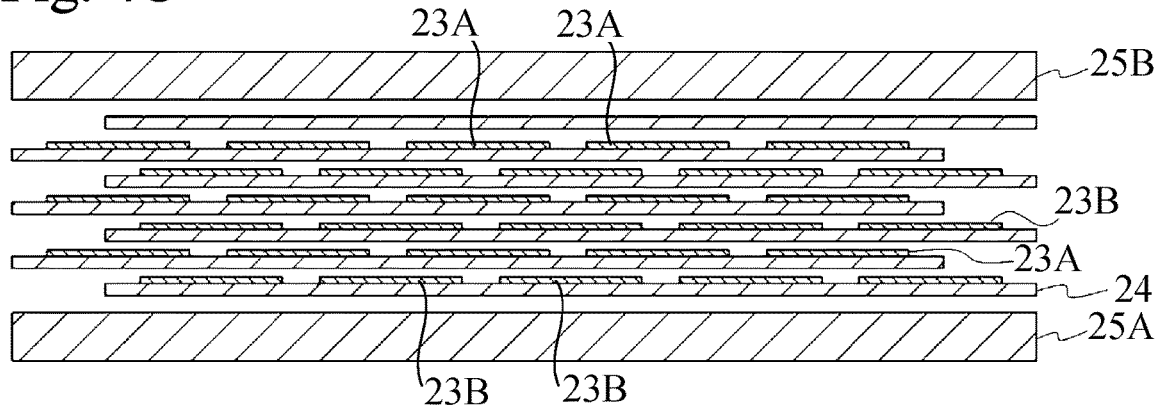

Next, in Step S4 of FIG. 3 (laminating step), as shown in FIG. 4C, the green sheets 24 on which the internal electrode patterns 23 are formed and the green sheets 25A and 25B on which the internal electrode patterns 23 are not formed are laminated in a predetermined order to create a block 30 of the green sheets. The green sheets 25A and 25B on which the internal electrode patterns 23 are not formed are used as the outer layers (the lower cover layer 5A and the upper cover layer 5B). The thickness of the green sheets 25A and 25B is greater than that of the green sheets 24.

The green sheets 24 having the internal electrode patterns 23A or 23B thereon are classified into two groups, i.e., the green sheets 24 having the internal electrode patterns 23A (which will form the internal electrode layer 3A) thereon and the green sheets 24 having the internal electrode patterns 23B (which will form the internal electrode layer 3B) thereon. The green sheets 24 having the internal electrode patterns 23A thereon and the green sheets 24 having the internal electrode patterns 23B thereon are stacked alternately in the laminating direction such that the internal electrode patterns 23A on the green sheet 24 and the internal electrode patterns 23B on the next or adjacent green sheet 24 are alternately shifted in the longitudinal direction of the green sheet 24.

Furthermore, three types of portions are defined in the green sheet block 30. Specifically, the green sheet block 30 includes a portion in which only the internal electrode patterns 23A are stacked in the stacking direction, a portion in which the internal electrode patterns 23A and 23B are stacked alternately in the stacking direction, and a portion in which only the internal electrode patterns 23B are stacked in the stacking direction.

Figure 4D:
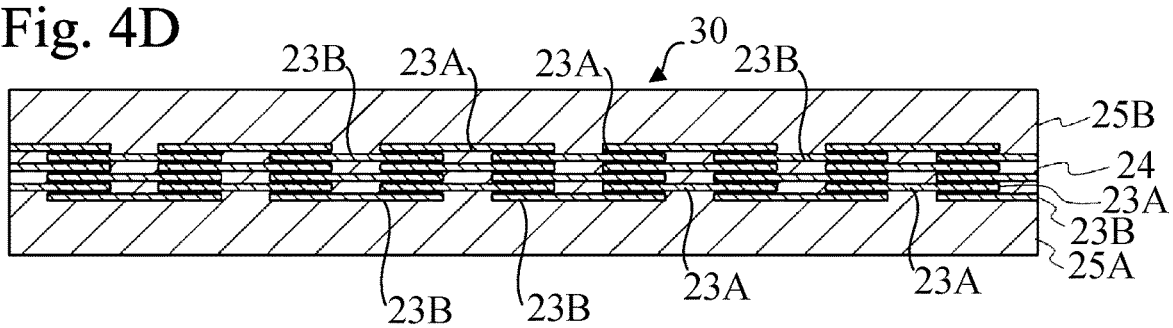

Next, in Step S5 of FIG. 3 (pressure bonding step), as shown in FIG. 4D, the laminate block 30 obtained in the laminating step of Step S4 of FIG. 3 is pressed such that the green sheets 24, 25A, and 25B are pressure-bonded. Pressing the laminate block 30 may be conducted by, for example, hydrostatically pressing the laminate block 30.

Figure 4E:
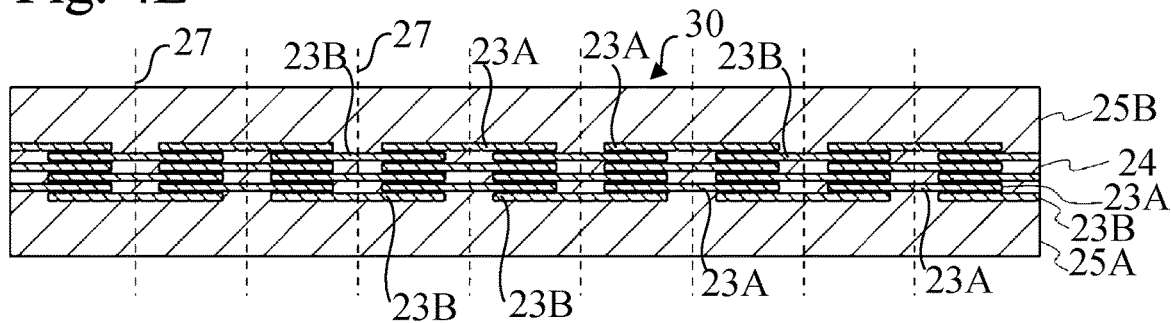

In Step S6 of FIG. 3 (cutting step), as shown in FIG. 4E, the pressed laminate block 30 is cut such that the block 30 is separated into a plurality of element bodies, each of which has a rectangular parallelepiped shape. Each element body has six surfaces. The cutting of the laminate block 30 is conducted at the portions in which only the internal electrode patterns 23A are stacked in the stacking direction, and the portions in which only the internal electrode patterns 23B are stacked in the stacking direction, as indicated by a plurality of vertical broken lines 27. The cutting of the laminate block 30 may be conducted by, for example, blade dicing or a similar method. The resulting element bodies 2' are shown in FIG. 4F.

Figure 4F:
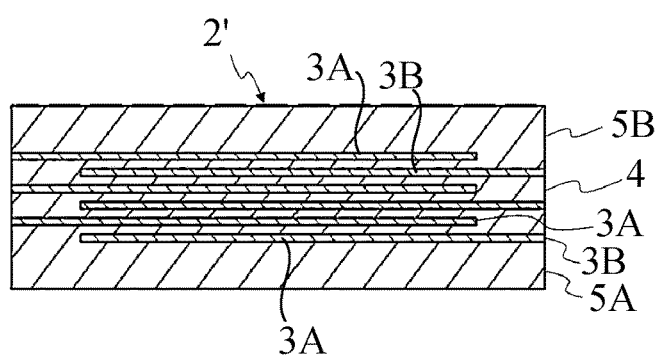

As illustrated in FIG. 4F, the internal electrode layers 3A and 3B are alternately laminated in such a manner that the dielectric layers 4 are interposed therebetween in each of the individual element bodies 2'. In addition, each element body 2' has the lower cover layer 5A and the upper cover layer 5B. The internal electrode layers 3A are exposed on one side surface of each element body 2', and the internal electrode layers 3B are exposed on the other side surface of each element body 2'. In FIG. 4F, an element body 2' is enlarged in the longitudinal direction.

Figure 4G:
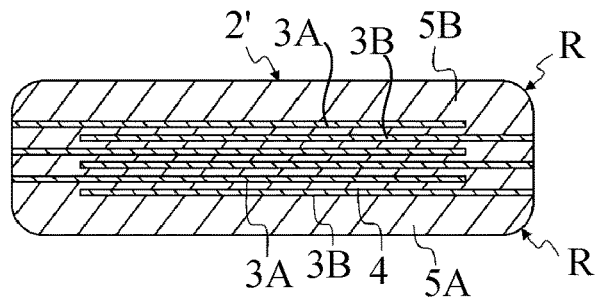

In Step S7 of FIG. 3 (chamfering step), as shown in FIG. 4G, corners of each element body 2' are chamfered, so that the element body 2 having curved surfaces R at corners are formed. For example, barrel polishing can be used for chamfering the element bodies 2'.

Next, in Step S8 of FIG. 3 (binder removing step), the binder contained in each of the element bodies 2 obtained in Step S7 of FIG. 3 is removed. The removal of the binder is conducted by, for example, heating the element bodies 2 in an $N_2$ atmosphere at about 350 degrees Celsius.

Next, in Step S9 of FIG. 3 (step of applying a paste for the base layers), a conductive paste for the base layers (underlayers) 7 is applied to both side surfaces of each element body 2 from which the binder is removed in Step S8 of FIG. 3 and is applied to the remaining four surfaces (upper, lower, front, and rear surfaces) of the element body 2, which are adjacent to the respective side surfaces. For example, a dipping method can be used to apply the conductive paste for the base layers. Then, the conductive paste is dried. The conductive paste for the base layers 7 includes a powder or filler of the metal used as the conductive material of the base layers 7. For example, when the metal used as the conductive material of the base layers 7 is Ni, the conductive paste for the base layers includes a powder or filler of Ni. The conductive paste for the base layers also includes, as the co-material, a ceramic component, which is the main component of the material of the dielectric layers 4, for example. Particles of oxide ceramics mainly composed of barium titanate (0.8 micrometers to 4 micrometers in D50 particle diameter), for example, are mixed in the conductive paste for the base layers, as the co-material. The conductive paste for the base layers further includes a binder and a solvent.

Figure 4H:
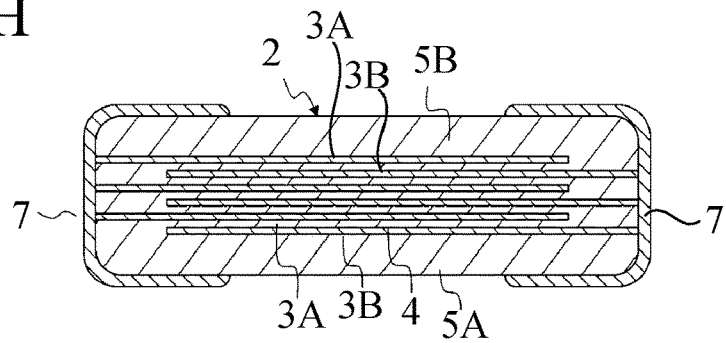
Figure 4I:
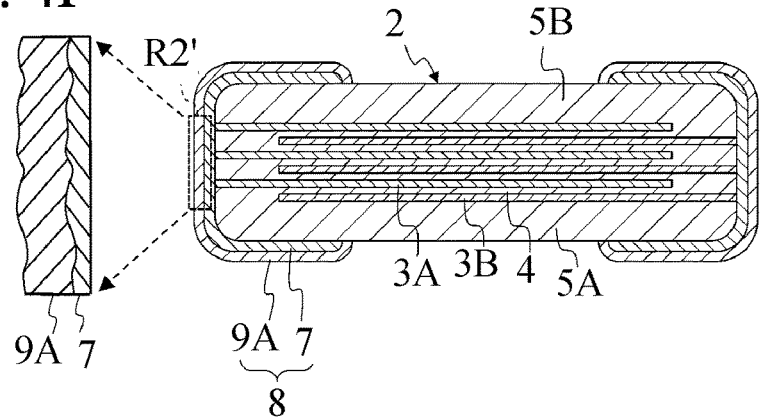
Figure 4J:
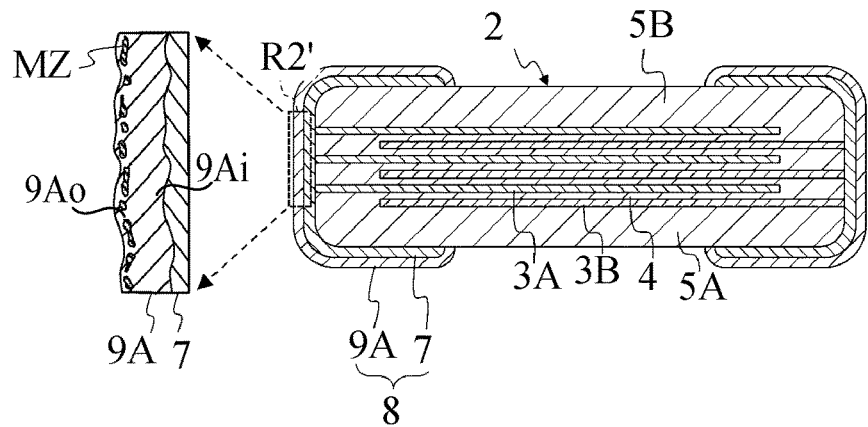
Figure 4K:
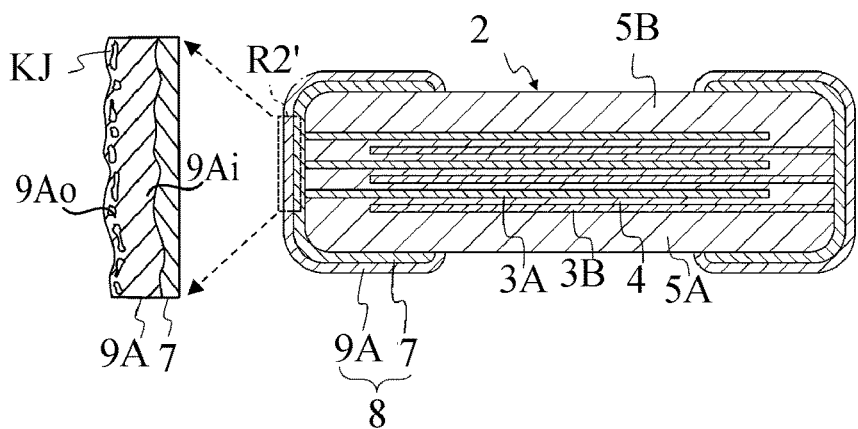
Figure 4L:
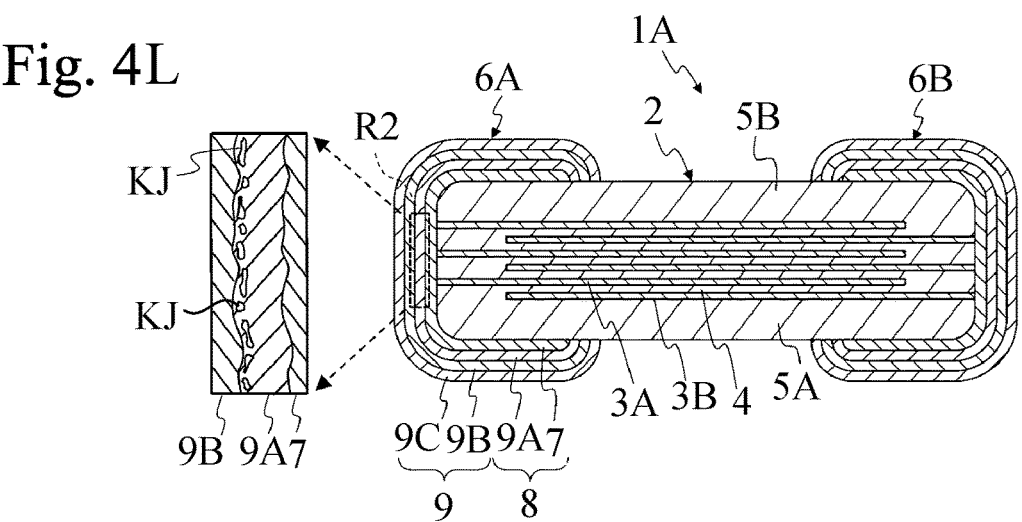

Next, in Step S10 of FIG. 3 (sintering step), as shown in FIG. 4H, the element bodies 2, on which the conductive paste for the base layers was applied in Step S9 of FIG. 3, undergo the sintering process such that the internal electrode layers 3A and 3B are integrated with the dielectric layers 4 in each element body 2 and the base layers 7 are cured and integrated with the element body 2. The sintering of the element bodies 2 is conducted in, for example, a sintering furnace in a temperature range from 1000 degrees Celsius to 1400 degrees Celsius for ten minutes to two hours.

If a base metal such as Ni or Cu is used as the material of the internal electrode layers 3A and 3B, the sintering process may be conducted in the sintering furnace while the interior of the sintering furnace is kept to a reducing atmosphere in order to prevent oxidation of the internal electrode layers 3A and 3B.

Next, in Step S11 of FIG. 3 (step of forming the innermost plating layers), as shown in FIG. 4I, the innermost plating layers 9A are formed on the base layers 7. In this case, the innermost plating layers 9A can be formed by that the element body 2, on which the base layers 7 are formed, is housed in a barrel and immersed in a plating solution in the barrel, and the barrel is rotated and energized.

Then, in Step S12 of FIG. 3 (surface oxidation step), as shown in FIG. 4J, each element body 2, in which the innermost plating layers 9A are formed on the base layers 7, is heated under a non-oxidizing atmosphere, and then exposed to an oxidizing atmosphere while maintaining the high temperature. Then, each element body 2 is returned to the non-oxidizing atmosphere and cooled. By such treatment, the outer side 9Ao of each innermost plating layer 9A is rapidly oxidized under the high temperature, and thus the metal oxide portions MZ are formed on the outer side 9Ao of the innermost plating layer 9A. The time and temperature for exposing the innermost plating layer 9A to the oxidizing atmosphere can be set so that the outer side 9Ao of the innermost plating layer 9A is non-uniformly oxidized. Accordingly, the process can be stopped before the outer side 9Ao of the innermost plating layer 9A is oxidized uniformly.

For example, in the oxidation process of the outer side 9Ao of the innermost plating layer 9A, each element body 2 is heated to 500 degrees Celsius under an $N_2$ atmosphere, and then exposed to the atmosphere Earth for two minutes while maintaining this temperature. Then, each element body 2 is returned to the $N_2$ atmosphere and cooled.

Next, in Step S13 of FIG. 3 (void forming step), as shown in FIG. 4K, the metal oxide in the portions MZ on the outer side 9Ao of the innermost plating layer 9A is removed by a scheme such as wet etching. In wet etching of the metal oxide in the portions MZ, for example, a dilute sulfuric acid solution can be used. Since the metal oxide portions MZ not only exist on the outer surface of the innermost plating layer 9A, but also intersect one another in the innermost plating layer 9A, the voids KJ can be formed in the innermost plating layer 9A by removing the metal oxide from the portions MZ.

However, the metal oxide may be partially left as shown in FIG. 2A. In a case in which the metal oxide portions MZ are disposed inside the voids KJ or are in contact with the voids KJ, the metal oxide portions MZ can capture hydrogen and further reduces diffusion.

The size of the voids KJ can be from 0.5 micrometers to 6.5 micrometers. The distance in the thickness direction from the outer surface of the innermost plating layer 9A to the voids KJ can be from 0.1 micrometers to 3.0 micrometers. The percentage of void in the outer side 9Ao is greater than that in the inner side 9Ai in the innermost plating layer 9A. The ratio of the length of the voids KJ in surface directions to the length of the voids KJ in the thickness direction of the innermost plating layer 9A can be from one to ten. That is to say, the innermost plating layer 9A includes more voids KJ of which the length in parallel to the outer and inner surfaces of the innermost plating layer 9A is greater than the length perpendicular to the outer and inner surfaces of the innermost plating layer 9A than voids KJ of which the length in in parallel to the outer and inner surfaces of the innermost plating layer 9A is less than the length perpendicular to the outer and inner surfaces of the innermost plating layer 9A.

Next, in Step S14 of FIG. 3 (step of forming intermediate and outermost plating layers), as shown in FIG. 4L, the intermediate plating layer 9B and the outermost plating layer 9C are sequentially formed on each innermost plating layer 9A. The intermediate plating layers 9B can be formed by immersing the element body 2, on which the innermost plating layers 9A having the voids KJ are formed, in a Ni plating solution in a barrel and by energizing and rotating the barrel. The outermost plating layers 9C can be formed by immersing the element body 2, on which the intermediate plating layers 9B are formed, in a Sn plating solution in a barrel and by energizing and rotating the barrel.

By providing voids KJ on the outer side 9Ao of the innermost plating layer 9A, the hydrogen generated when forming the intermediate plating layer 9B containing Ni can be effectively prevented from diffusing into the element body 2, and the degradation of insulation of the dielectric layers 4 can be minimized. Such an effect of blocking the diffusion of hydrogen is achieved not only during the process of forming the intermediate plating layer 9B, but also achieved for the hydrogen remaining in the intermediate plating layer 9B after forming the intermediate plating layer 9B. Although some portions of the intermediate plating layer 9B may enter into some portions of the voids KJ, there is no problem in performance of the product.

Second Embodiment

Figure 5:
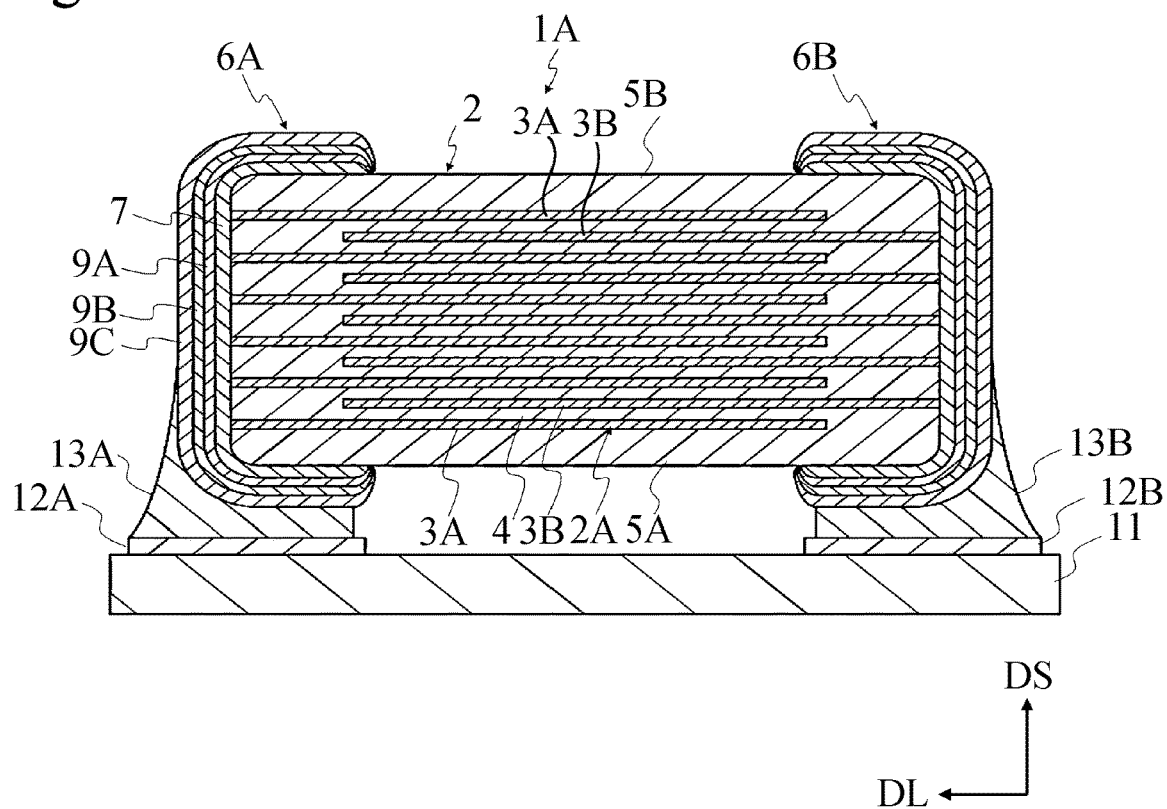
FIG. 5 is a cross-sectional view showing a circuit board arrangement according to a second embodiment of the present invention, on which a multilayer ceramic capacitor is mounted.

FIG. 5 is a cross-sectional view showing a circuit board arrangement according to a second embodiment of the present invention, on which a multilayer ceramic capacitor is mounted. The circuit board arrangement includes a circuit board 11 and the multilayer ceramic capacitor 1A mounted on the circuit board 11.

As shown in FIG. 5, land electrodes 12A and 12B are formed on the circuit board 11. The circuit board 11 may be a printed circuit board or a semiconductor board formed from, for example, Si. The multilayer ceramic capacitor 1A is connected to the land electrodes 12A and 12B via solder layers 13A and 13B attached to the outermost plating layers 9C of the external electrodes 6A and 6B, respectively.

By providing voids KJ in the innermost plating layers 9A, stress exerted in the exterior electrodes 6A and 6B can be absorbed by the voids KJ. Therefore, when external stress is applied to the external electrodes 6A and 6B due to deflection or expansion and contraction of the circuit board 11, transmission of the stress to the element body 2 through the external electrodes 6A and 6B can be minimized, so that cracking of the element body 2 can be minimized.

Third Embodiment

Figure 6:
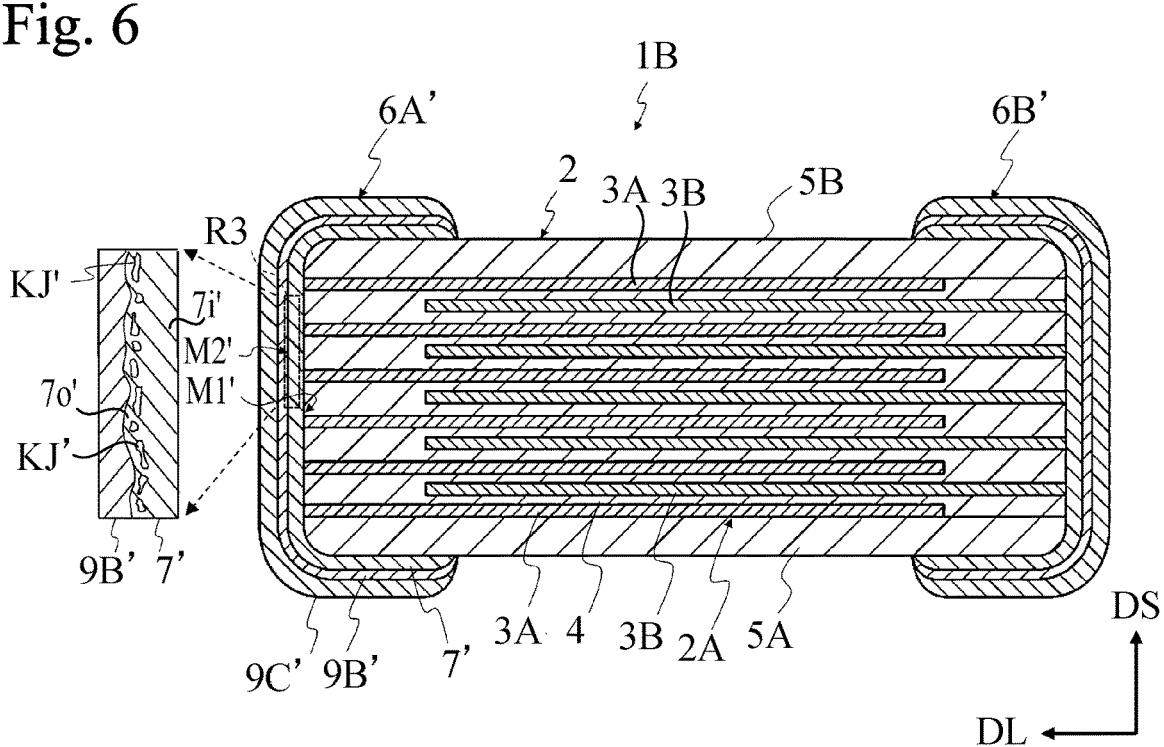
FIG. 6 is a cross-sectional view showing a multilayer ceramic capacitor according to a third embodiment of the present invention taken along the longitudinal direction thereof.

FIG. 6 is a cross-sectional view showing a multilayer ceramic capacitor according to a third embodiment of the present invention taken along the longitudinal direction thereof. In FIG. 6, a cross sectional region R3 of an external electrode 6A' is shown in enlargement.

In FIG. 6, the multilayer ceramic capacitor 1B has external electrodes 6A' and 6B' instead of the external electrodes 6A and 6B of FIG. 2A.

The external electrodes 6A' and 6B' are located on opposite sides of the element body 2, respectively, so that the external electrodes 6A' and 6B' are spaced apart (separated) from each other. Each of the external electrodes 6A' and 6B' continuously covers the top surface, the side surface, and the bottom surface of the element body 2. Each of the external electrodes 6A' and 6B' may also cover the front surface and the rear surface of the element body 2.

The external electrode 6A' is connected to the internal electrode layers 3A, whereas the external electrode 6B' is connected to the internal electrode layers 3B.

Each of the external electrodes 6A and 6B has a base layer 7' that is an electrical conductive layer, a plating layer 9B' that includes Ni, and an outermost plating layer 9C' that is solder-wettable. The base layer 7' has many voids KJ' in such a manner that the outer side M2' farther from the element body 2 includes more voids KJ' than the inner side M1' closer to the element body 2 as shown in the cross section of FIG. 6. The inner side M1' is adjacent to the boundary between the base layer 7' and the element body 2, whereas the outer side M2' is adjacent to the boundary between the base layer 7' and the plating layer 9B'.

The base layers 7' of the external electrodes 6A' and 6B' are formed on opposite surfaces of the element body 2 so as to be separated from each other in the longitudinal direction DL. Each of the base layers 7' continuously covers the top surface, the side surface, and the bottom surface of the element body 2. Each of the base layers 7' may also cover the front surface and the rear surface of the element body 2.

Multiple voids KJ' are provided in the base layer 7' and can be distributed over surface directions of the base layer 7' entirely. The voids KJ may be distributed on the outer side 7o' of the base layer 7' in a layered manner over surface directions entirely. The base layer 7' can include a metal capable of forming an oxide corresponding to the shapes of the voids KJ'. The voids KJ in the base layer 7' can be provided in opposite sides for the element body 2. The outer side 7o' of the base layer 7' is the side on which the plating layer 9B' is formed. Accordingly, the void KJ may be provided not only on the two outer sides 7o' in the longitudinal direction DL, but also on the two outer sides in the width direction DW, and on the two outer sides in the stacking direction DS.

Before the plating layer 9B' is formed on the outer surface of the base layer 7', the metal contained in the base layer 7' is non-uniformly oxidized while exposing the external surface of the base layer 7' to an oxidizing atmosphere, and then, the oxide of the metal is removed, so that the voids KJ' are formed on the outer side 7o' of the base layer 7'. In order to non-uniformly oxidize the metal contained in the base layer 7', the outer side 7o' of the base layer 7' can be rapidly oxidized. The voids KJ' can be distributed in a spongy or porous manner on the outer side 7o' of the base layer 7'. That is, the outer side 7o' includes more voids KJ than the inner side 7i' in the base layer 7'.

The main component of the material of the base layer 7' can be a metal, for example, Cu, Fe, Zn, Sn, Pb, or Cr, or may be an alloy containing at least one of the metals. The base layer 7' is, for example, a Cu plating layer. The Cu base layer 7' can improve the adhesion of the plating layer 9B' to the base layer 7 and can ensure good electrical conductivity. In addition, by using a Cu layer as the base layer 7', voids KJ' can be formed easily on the outer side 7o' of the base layer 7'.

The base layer 7' may further include co-material particles. The main component of the co-material is, for example, a ceramic component that is the same as the main component of the material of the dielectric layers 4. The base layer 7' may include a glass component. The base layer 7' is preferably a sintered layer that was sintered after a metal paste (material of the base layer 7') is applied to the element body 2.

The thickness of the base layer 7' is preferably from 2 micrometers to 50 micrometers. The voids KJ' are preferably located in a range from 0.1 micrometers to 3.0 micrometers in the thickness direction from the external surface of the base layer 7'. It is preferable that the length of each void KJ' in surface directions be greater than the length thereof in the thickness direction of the base layer 7'. In addition, it is preferable that the base layer 7' include more voids KJ' of which the length in surface directions is greater than that in the thickness direction than voids KJ' of which the length in surface directions is less than that in the thickness direction. The length of the voids KJ' in the longitudinal direction thereof is preferably from 0.5 micrometers to 6.5 micrometers. It is preferable that, in the base layer 7', voids KJ' of which the length in surface directions is four times or more than the length in the thickness direction account for at least 50% of the total voids KJ'.

The plating layer 9B' is formed on the base layer 7'. The plating layer 9B' is, for example, a Ni plating layer.

The outermost plating layer 9C' is formed on the plating layer 9B'. The outermost plating layer 9C' is, for example, a Sn plating layer.

In the embodiment, by providing voids KJ' on the outer side 7o' of the base layer 7', diffusion of hydrogen generated when forming the plating layer 9B' on the base layer 7' can be blocked by the voids KJ'. Hydrogen diffuses from the plating layer 9B', but is unlikely to pass through the voids KJ' in the base layer 7', so that hydrogen is unlikely to reach the element body 2. Thus, it is possible to prevent the hydrogen generated when forming the plating layers 9B' on the base layers 7' from diffusing into the element body 2, to reduce the hydrogen reduction at the dielectric layers 4 between the internal electrode layers 3A and 3B, and to minimize deterioration of electrical insulation of the dielectric layers 4.

Figure 7:
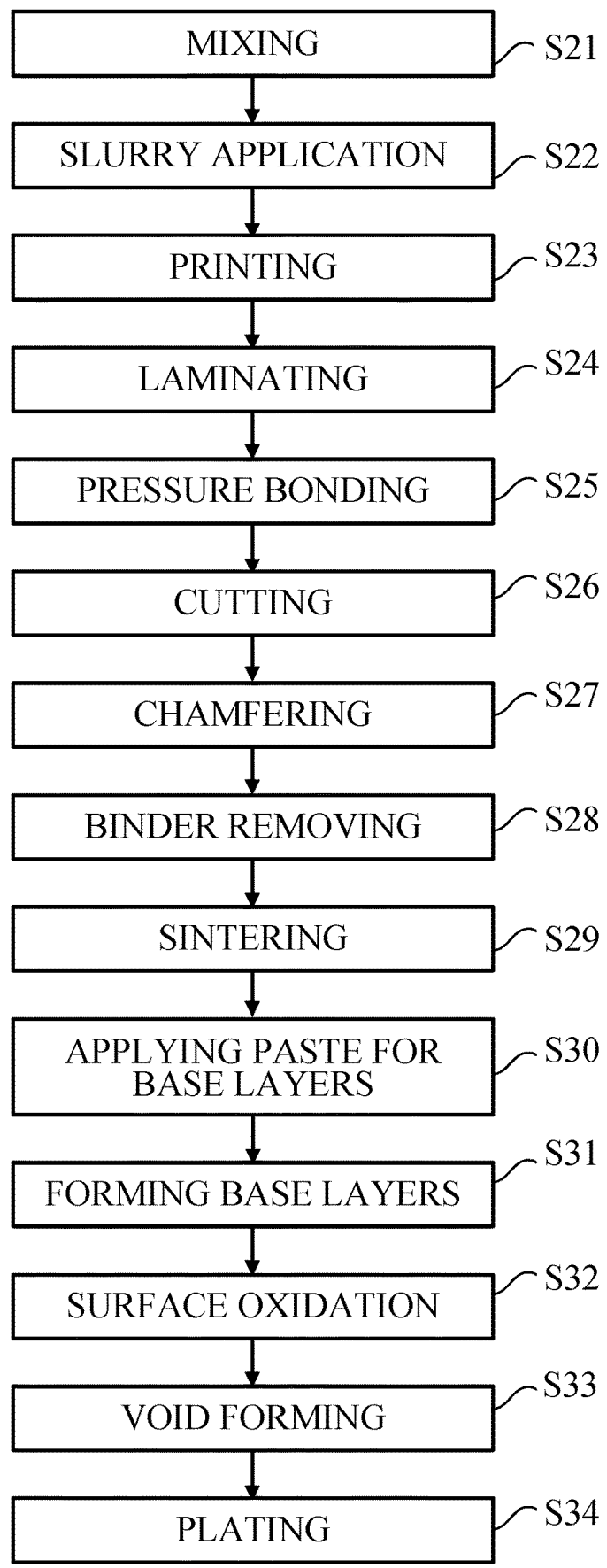
FIG. 7 is a flowchart showing a method of manufacturing a multilayer ceramic capacitor according to the third embodiment.

FIG. 7 is a flowchart showing a method of manufacturing a multilayer ceramic capacitor according to the third embodiment.

As shown in Steps S21 to S28 of FIG. 7, the element body 2 from which the binder has been removed is fabricated in the same manner as in Steps S1 to S8 of FIG. 3.

Next, as shown in Step S29 of FIG. 7 (sintering step), each element body 2, from which the binder has been removed in Step S28, is sintered to integrate the internal electrode layers 3A and 3B with the dielectric layers 4. The sintering of the element bodies 2 is conducted in, for example, a sintering furnace in a temperature range from 1000 degrees Celsius to 1350 degrees Celsius for ten minutes to two hours.

Next, in Step S30 of FIG. 7 (step of applying a paste for the base layers), a conductive paste for the base layers (underlayers) 7' is applied to both side surfaces of each sintered element body 2 and is applied to the remaining four surfaces (upper, lower, front, and rear surfaces) of the element body 2, which are adjacent to the respective side surfaces. Then, the conductive paste is dried. The conductive paste for the base layers 7' includes a powder or filler of the metal used as the conductive material of the base layers 7'. For example, when the metal used as the conductive material of the base layers 7' is Cu, the conductive paste for the base layers includes a powder or filler of Cu. Cu is preferred for the base layers 7' because it provides good electrical conductivity. The conductive paste for the base layers may also include, as the co-material, a ceramic component, which is the main component of the material of the dielectric layers 4, for example. The conductive paste for the base layers further includes a binder and a solvent.

Next, in Step S31 of FIG. 7 (step of forming the base layers), the element bodies 2, on which the conductive paste for the base layers was applied, undergo a sintering process such that the base layers 7' are cured and integrated with the element body 2. The sintering of the element bodies 2 is conducted in, for example, a sintering furnace at a temperature of 850 degrees Celsius for 15 minutes or more.

Then, in Step S32 of FIG. 7 (surface oxidation step), each element body 2, on which the base layers 7' were formed, is heated under a non-oxidizing atmosphere, and then exposed to an oxidizing atmosphere while maintaining the high temperature. Then, each element body 2 is returned to the non-oxidizing atmosphere and cooled. By such treatment, the outer side 7o' of each base layer 7' is rapidly oxidized under the high temperature, and thus metal oxide portions are formed on the outer side 7o' of the base layers 7'. The time and temperature for exposing the base layers 7' to the oxidizing atmosphere can be set so that the outer side 7o' of the base layers 7' is non-uniformly oxidized. Accordingly, the process can be stopped before the outer side 7o' of the base layers 7' is oxidized uniformly.

For example, in the oxidation process of the outer side 7o' of the base layers 7', each element body 2 is heated to 500 degrees Celsius under an $N_2$ atmosphere, and then exposed to the atmosphere Earth for two minutes while maintaining this temperature. Then, each element body 2 is returned to the $N_2$ atmosphere and cooled.

Next, in Step S33 of FIG. 7 (void forming step), the metal oxide distributed in the outer side 7o' of the base layers 7' is removed by a scheme such as wet etching. In wet etching of the metal oxide, for example, a dilute sulfuric acid solution can be used. Since the metal oxide not only exists on the outer surface of the base layers 7', but also intersect one another in the base layers 7', the voids KJ' can be formed in the base layer 7' by removing the metal oxide.

However, the metal oxide may be partially left as similar to FIG. 2A. In a case in which the metal oxide portions are disposed inside the voids KJ' or are in contact with the voids KJ', the metal oxide portions can capture hydrogen and further reduces diffusion.

The size of the voids KJ' can be from 0.5 micrometers to 6.5 micrometers. The distance in the thickness direction from the outer surface of the base layer 7' to the voids KJ' can be from 0.1 micrometers to 3.0 micrometers. The percentage of void in the outer side 7o' is greater than that in the inner side 7i' in the base layer 7'. The ratio of the length of the voids KJ' in surface directions to the length of the voids KJ' in the thickness direction of the base layers 7' can be from one to four. That is to say, the base layers 7' includes more voids KJ' of which the length in parallel to the outer and inner surfaces of the base layers 7' is greater than the length perpendicular to the outer and inner surfaces of the base layers 7' than voids KJ' of which the length in in parallel to the outer and inner surfaces of the base layers 7' is less than the length perpendicular to the outer and inner surfaces of the base layers 7'.

Next, in Step S34 of FIG. 7 (plating step), the plating layer 9B' and the outermost plating layer 9C' are sequentially formed on each base layer 7'. The plating layers 9B' can be formed by immersing the element body 2, on which the base layers 7' having the voids KJ' are formed, in a Ni plating solution in a barrel and by energizing and rotating the barrel. The outermost plating layers 9C can be formed by immersing the element body 2, on which the plating layers 9B' are formed, in a Sn plating solution in a barrel and by energizing and rotating the barrel.

The plating layer 9B' is, for example, a Ni plating layer, and the outermost plating layer 9C' is, for example, a Sn plating layer. Although some portions of the plating layer 9B' may enter into some portions of the voids KJ', there is no problem in performance of the product.

Fourth Embodiment

Figure 8:
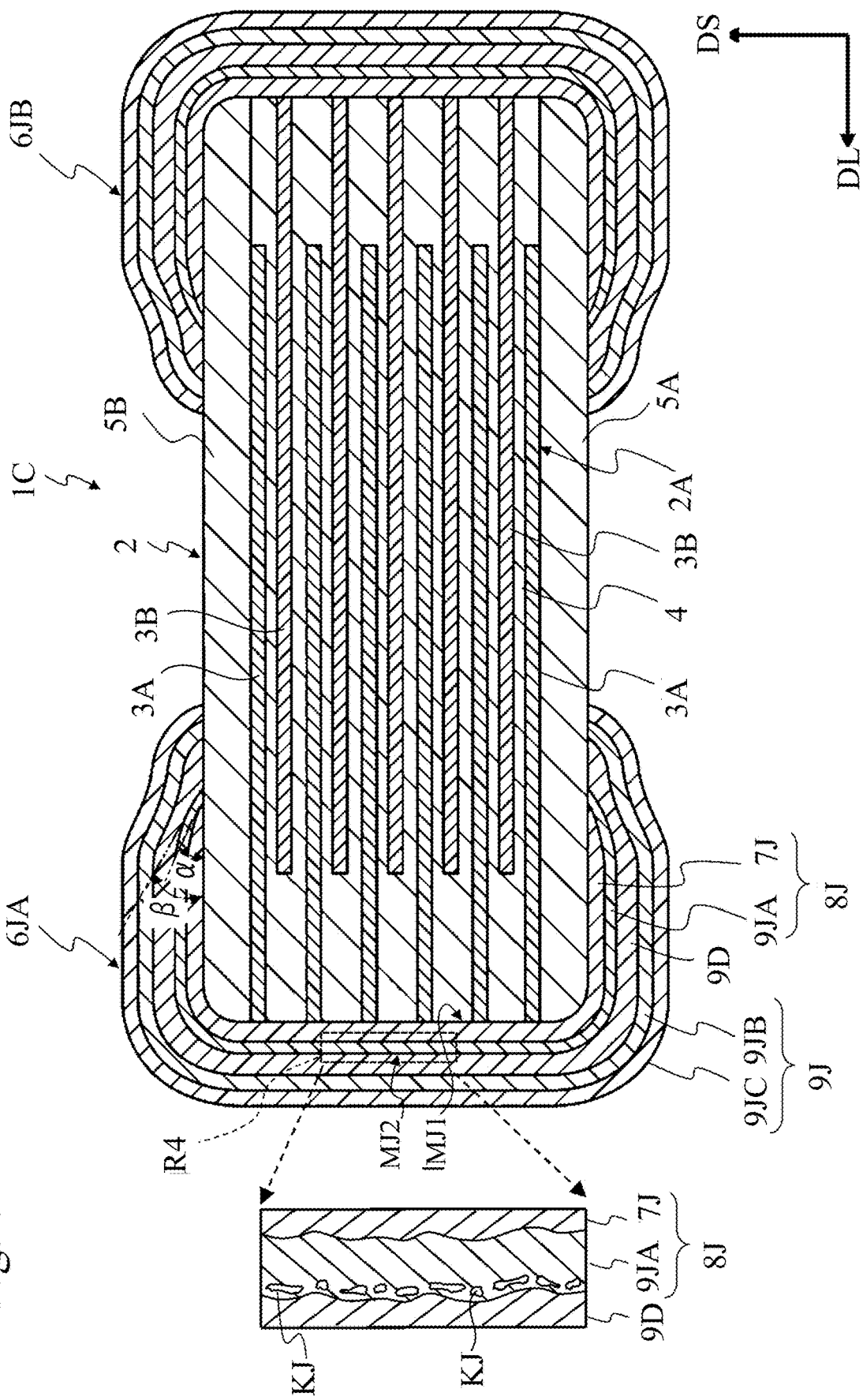
FIG. 8 is a cross-sectional view showing a multilayer ceramic capacitor according to a fourth embodiment of the present invention taken along the longitudinal direction thereof.

FIG. 8 is a cross-sectional view showing a multilayer ceramic capacitor according to a fourth embodiment of the present invention taken along the longitudinal direction thereof. In FIG. 8, a cross sectional region R4 of an external electrode 6JA is shown in enlargement.

In FIG. 8, the multilayer ceramic capacitor 1C has external electrodes 6JA and 6JB instead of the external electrodes 6A and 6B of FIG. 2A.

The external electrodes 6JA and 6JB are located on opposite sides of the element body 2, respectively, so that the external electrodes 6JA and 6JB are spaced apart (separated) from each other. Each of the external electrodes 6JA and 6JB continuously covers the top surface, the side surface, and the bottom surface of the element body 2. Each of the external electrodes 6JA and 6JB may also cover the front surface and the rear surface of the element body 2.

The external electrode 6JA is connected to the internal electrode layers 3A, whereas the external electrode 6JB is connected to the internal electrode layers 3B.

Each of the external electrodes 6JA and 6JB has an electrical conductive layer 8J, an electrical conductive resin layer 9D, and a plating layer 9J that includes Ni. The conductive layer 8J has many voids KJ in such a manner that the outer side MJ2 farther from the element body 2 includes more voids KJ than the inner side MJ1 closer to the element body 2 as shown in the cross section of FIG. 6. The inner side MJ1 is adjacent to the boundary between the conductive layer 8J and the element body 2, whereas the outer side MJ2 is adjacent to the boundary between the conductive layer 8J and the conductive resin layer 9D.

The conductive layer 8J has a base layer 7J formed on the element body 2 and an innermost plating layer 9JA having the outer side MJ2 in which more voids KJ are disposed. The plating layer 9J has an intermediate plating layer 9JB including Ni and an outermost plating layer 9JC that is solder-wettable.

The base layer 7J and the innermost plating layer 9JA can be formed in the same manner as the base layer 7 and the innermost plating layer 9A of FIG. 2A. However, the base layer 7J and the base layer 9JA extend more widely on the top and bottom surfaces and the front and rear surfaces of the element body 2.

In a case in which the base layer 7J is a sintered layer having Ni as a main component, the edge angle α of the base layer 7J can be adjusted by adjusting the viscosity of the Ni paste, the ratio of the co-material, and/or the ratio of the additive, and also by adjusting the temperature change during sintering.

In a case in which the innermost plating layer 9JA is an electrolytic plating layer containing Cu, the edge angle β of the innermost plating layer 9A can be adjusted by adjusting the plating conditions, such as the pH of the plating solution, the temperature of the plating solution, the plating current density, and/or the plating time.

The conductive resin layer 9D is located between the conductive layer 8J and the plating layer 9J. The thickness of the conductive resin layer 9D is preferably from 2 micrometers to 40 micrometers.

The main component of the material of the conductive resin layer 9D is a mixture of a thermosetting resin, for example, an epoxy resin, a phenol resin, a urethane resin, a silicone resin, and a polyimide resin; and a conductive filler made from a metal, for example, copper, tin, nickel, silver, gold, and zinc, or from an alloy containing at least one of the metals. The form of the conductive filler is spherical, flattened or fibrous, but is not particularly limited as long as the form can ensure conductivity. The conductive resin layer 9D can be formed by applying the conductive resin paste so that the innermost plating layer 9JA is covered by the dip method or the printing method and thermally curing it. The material of the conductive filler is preferably one containing silver in terms of conductivity.

The intermediate plating layer 9JB is formed on the conductive resin layer 9D. The outermost plating layer 9JC is formed on the intermediate plating layer 9JB.

The intermediate plating layer 9JB and the outermost plating layer 9JC can be formed in the same manner as the intermediate plating layer 9B and the outermost plating layer 9C of FIG. 2A. For example, the intermediate plating layer 9JB is a Ni plating layer and the outermost plating layer 9JC is a Sn plating layer.

In the embodiment, by providing voids KJ on the outer side of the innermost plating layer 9JA, diffusion of hydrogen generated when forming the intermediate plating layer 9JB on the conductive resin layer 9D can be blocked by the voids KJ. The outer side of the innermost plating layer 9JA is the side on which the conductive resin layer 9D is formed. Hydrogen diffuses from the intermediate plating layer 9JB, but is unlikely to pass through the voids KJ in the innermost plating layer 9JA, so that hydrogen is unlikely to reach the element body 2. Thus, it is possible to prevent the hydrogen generated when forming the intermediate plating layer 9JB on the conductive resin layer 9D from diffusing into the element body 2 to reduce the hydrogen reduction at the dielectric layers 4 between the internal electrode layers 3A and 3B, and to minimize degradation of electrical insulation of the dielectric layers 4. The features and effects regarding the voids KJ are the same as those described in conjunction with the first embodiment.

In addition, by providing the conductive resin layer 9D between the conductive layer 8J and the intermediate plating layer 9J, stress exerted in the external electrodes 6JA and 6JB can be absorbed by the conductive resin layer 9D. Therefore, when external stress is applied to the external electrodes 6JA and 6JB due to deflection or expansion and contraction of the circuit board on which the multilayer ceramic capacitor 1C is mounted, transmission of the stress to the element body 2 through the external electrodes 6JA and 6JB can be minimized, so that cracking of the element body 2 can be minimized.

Fifth Embodiment

Figure 9:
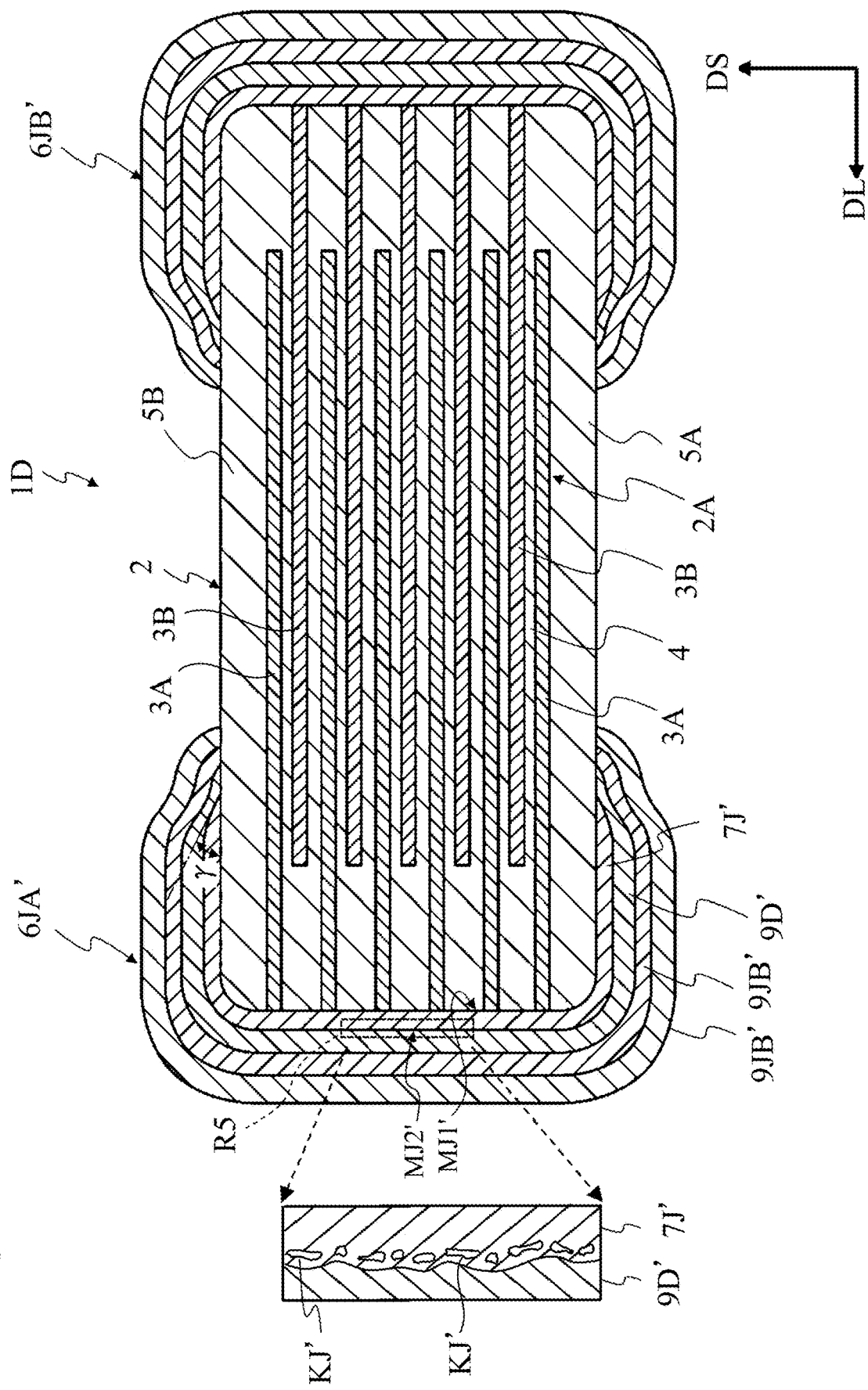
FIG. 9 is a cross-sectional view showing a multilayer ceramic capacitor according to a fifth embodiment of the present invention taken along the longitudinal direction thereof.

FIG. 9 is a cross-sectional view showing a multilayer ceramic capacitor according to a fifth embodiment of the present invention taken along the longitudinal direction thereof. In FIG. 9, a cross sectional region R5 of an external electrode 6JA' is shown in enlargement.

In FIG. 9, the multilayer ceramic capacitor 1D has external electrodes 6JA' and 6JB' instead of the external electrodes 6A' and 6B' of FIG. 6.

The external electrodes 6JA' and 6JB' are located on opposite sides of the element body 2, respectively, so that the external electrodes 6JA' and 6JB' are spaced apart (separated) from each other. Each of the external electrodes 6JA' and 6JB' continuously covers the top surface, the side surface, and the bottom surface of the element body 2. Each of the external electrodes 6JA' and 6JB' may also cover the front surface and the rear surface of the element body 2.

The external electrode 6JA' is connected to the internal electrode layers 3A, whereas the external electrode 6JB' is connected to the internal electrode layers 3B.

Each of the external electrodes 6JA', 6JB' has a base layer 7J', an electrical conductive resin layer 9D', a plating layer 9JB' that includes Ni, and an outermost plating layer 9JC' that is solder-wettable. The base layer 7J' has many voids KJ' in such a manner that the outer side MJ2' farther from the element body 2 than the inner side MJ1' closer to the element body 2 as shown in the cross section of FIG. 9. The inner side MJ1' is adjacent to the boundary between the base layer 7J' and the element body 2, whereas the outer side MJ2' is adjacent to the boundary between the base layer 7J' and the conductive resin layer 9D'.

The base layer 7' is formed on the element body 2, the conductive resin layer 9D' is formed on the base layer 7', and the plating layer 9JB' is formed on the conductive resin layer 9D'.

The base layer 7J' can be formed in the same manner as the base layer 7' of FIG. 6. However, the base layer 7J' extends more widely on the top and bottom surfaces and the front and rear surfaces of the element body 2. It is preferable that the thickness of the base layer 7J' be from 2 micrometers to 40 micrometers.

In a case in which the base layer 7J' is a sintered layer having Cu as the main component, the edge angle γ can be adjusted by adjusting the viscosity of the Cu paste, the ratio of the co-material, and/or the ratio of the additive, and also by adjusting the temperature change during sintering.

The conductive resin layer 9D' is located between the base layer 7J' and the plating layer 9JB'. The conductive resin layer 9D' can be formed in the same manner as the conductive resin layer 9D of FIG. 8.

The plating layer 9JB' is formed on the conductive resin layer 9D'. The outermost plating layer 9JC' is formed on the plating layer 9JB'. The plating layer 9JB' and the outermost plating layer 9JC' can be formed in the same manner as the intermediate plating layer 9JB and the outermost plating layer 9JC in FIG. 8. For example, the plating layer 9JB' is a Ni plating layer and the outermost plating layer 9JC' is a Sn plating layer.

In the embodiment, by providing voids KJ' on the outer side of the base layer 7J', diffusion of hydrogen generated when forming the plating layer 9JB' on the conductive resin layer 9D' can be blocked by the voids KJ'. The outer side of the base layer 7J' is the side on which the conductive resin layer 9D' is formed. Hydrogen diffuses from the plating layer 9JB', but is unlikely to pass through the voids KJ' in the base layer 7J', so that hydrogen is unlikely to reach the element body 2. Thus, it is possible to prevent the hydrogen generated when forming the plating layer 9JB' on the conductive resin layer 9D' from diffusing into the element body 2 to reduce the hydrogen reduction at the dielectric layers 4 between the internal electrode layers 3A and 3B, and to minimize degradation of electrical insulation of the dielectric layers 4. The features and effects regarding the voids KJ' are the same as those described in conjunction with the third embodiment.

In addition, by providing a conductive resin layer 9D' between the base layer 7J' and the plating layer 9JB', stress exerted in the external electrodes 6JA' and 6JB' can be absorbed by the conductive resin layer 9D'. Therefore, when external stress is applied to the external electrodes 6JA' and 6JB' due to deflection or expansion and contraction of the circuit board on which the multilayer ceramic capacitor 1D is mounted, transmission of the stress to the element body 2 through the external electrodes 6JA' and 6JB' can be minimized, so that cracking of the element body 2 can be minimized.

Sixth Embodiment

Figure 10:
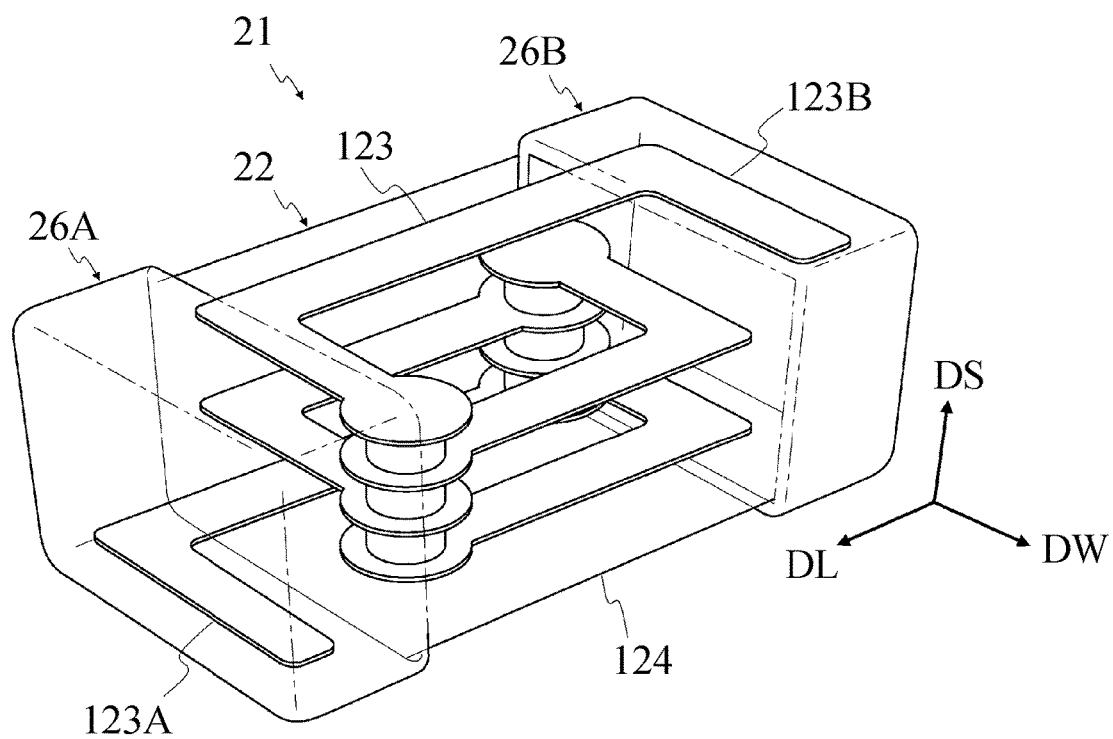
FIG. 10 is a perspective view showing a ceramic electronic component according to a sixth embodiment of the present invention.

FIG. 10 is a perspective view showing a ceramic electronic component according to a sixth embodiment of the present invention. In FIG. 10, a chip inductor is taken as an example as a ceramic electronic component.

The chip inductor 21 includes an element body 22 and two external electrodes 26A and 26B. The element body 22 includes a coil pattern 123 that includes two terminal segments 123A and 123B formed at both ends thereof and a magnetic material 124. The magnetic material 124 is used as a dielectric to insulate the internal electrode layers 123A and 123B. The shape of the element body 22 may be a substantially rectangular parallelepiped shape.

The external electrodes 26A and 26B are located on opposite sides of the element body 22, respectively, so that the external electrodes 26A and 26B are spaced (separated) from each other. Each of the external electrodes 26A and 26B continuously extends from the side surface of the element body 22 to the front and rear surfaces and the top and bottom surfaces.

The coil pattern 123 is covered with magnetic material 124. However, the terminal segment 123A is exposed from the magnetic material 124 on one side of the element body 22 and is connected to the external electrode 26A, whereas the terminal segment 123B is exposed from the magnetic material 124 on the other side of the element body 22 and is connected to the external electrode 26B.

The material of the coil pattern 123 and the terminal segments 123A and 123B may be, for example, a metal such as Cu, Fe, Zn, Al, Sn, Ni, Ti, Ag, Au, Pt, Pd, Ta, and W, or an alloy containing at least one of these metals. The magnetic material 124 is, for example, a ferrite.

Each of the external electrodes 26A and 26B can be configured in the same manner as that of the external electrodes 6A and 6B in FIG. 1. In other words, each of the external electrodes 26A and 26B has an electrical conductive layer and a plating layer that includes Ni. The electrical conductive layers of the external electrodes 26A and 26B are connected to the terminal segments 123A and 123B, respectively. The electrical conductive layer of each of the terminal segments 123A and 123B has many voids in such a manner that the outer side farther from the element body 22 includes more voids than the inner side closer to the element body 22. Consequently, diffusion of hydrogen generated when forming the plating layer on the conductive layer can be blocked by the voids, and it is possible to prevent hydrogen from diffusing into the element body 22.

However, each of the external electrodes 26A and 26B may be configured in the same manner as the external electrodes 6A' and 6B' of FIG. 6, the external electrodes 6JA and 6JB of FIG. 8, or the external electrodes 6JA' and 6JB' of FIG. 9.

In the above-described embodiments, the multilayer ceramic capacitors and the chip inductor are taken as examples as electronic components, but the electronic components may include a chip resistor or a sensor chip. In the above-described embodiments, each of the electronic components includes two external electrodes, but the electronic component may include three or more external electrodes.

For each embodiment, the size, location, percentage, etc. of the voids can be checked by measuring them of, for example, 20 voids randomly selected from one or more cross-sectional areas of the external electrode, and by averaging the measured values.

Experiments

The multilayer ceramic capacitors 1A to 1D (samples 1 to 4) shown in FIGS. 2A, 6, 8, and 9 were subjected to a highly accelerated life test (HALT) under a high temperature of 150 degrees Celsius and a high electric field of 40 volts per micrometer, and the Mean Time To Failure (MTTF) was measured for each sample.

In the experiments, a Cu base layer, a Ni plating layer and a Sn plating layer were used as the base layer 7', the plating layer 9B', and the outermost plating layer 9C' in FIG. 6, respectively. A comparative sample was prepared in which the Cu base layer was not oxidized, and thus the oxide removal was not conducted.

The following results were obtained for the above samples 1 to 4 and the comparative sample.

MTTF of sample 1: 450 min
MTTF of sample 2: 350 min
MTTF of sample 3: 470 min
MTTF of sample 4: 390 min
MTTF of the comparative sample: 275 min From the above results, it was found that in any of samples 1 to 4, MTTF can be increased by providing voids in the inner layer for the plating layer including Ni, compared with the configuration (comparative sample) in which there are no voids in the inner layer for the plating layer including Ni.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

REFERENCE SYMBOLS 1A, 1B, 1C, 1D: Multilayer Ceramic Capacitor
2: Element body
2A: Laminate
3A, 3B: Internal electrode layer
4: Dielectric layer
5A, 5B: Cover Layer
6A, 6B, 6A', 6B', 6JA, 6JB, 6JA', 6JB': External electrode
7, 7', 7J, 7J': Base layer
8, 8Z, 8J: Electrical conductive layer
9: Plating layer

What is claimed is:

1. A ceramic electronic component comprising:
an element body comprising a dielectric and internal electrodes; and
external electrodes formed on the element body, each of the external electrodes comprising an electrical conductive layer connected to the internal electrodes, the electrical conductive layer comprising an outer side and an inner side, the outer side being farther from the element body than the inner side, the outer side comprising more voids than the inner side, the voids having at least partial empty space.

2. The ceramic electronic component according to claim 1, wherein each of the external electrodes further comprises a plating layer formed outside the electrical conductive layer and containing Ni.

3. The ceramic electronic component according to claim 1, wherein the voids in the electrical conductive layer are located in a range from 0.1 micrometers to 3.0 micrometers from an outer surface of the electrical conductive layer in a thickness direction of the electrical conductive layer.

4. The ceramic electronic component according to claim 1, wherein each of the voids has a length in a thickness direction of the electrical conductive layer and a length in a surface direction of the electrical conductive layer,
the length of the voids in the surface direction is greater than the length of the voids in the thickness direction.

5. The ceramic electronic component according to claim 1, wherein each of the voids has a length in a thickness direction of the electrical conductive layer and a length in a surface direction of the electrical conductive layer,
the electrical conductive layer comprising more voids of which the length in the surface direction is greater than the length in the thickness direction than voids of which the length in surface directions is less than the length in the thickness direction.

6. The ceramic electronic component according to claim 1, the voids have a longitudinal length in a longitudinal direction thereof, the longitudinal length being from 0.5 micrometers to 6.5 micrometers.

7. The ceramic electronic component according to claim 1, wherein each of the voids has a length in a thickness direction of the electrical conductive layer and a length in a surface direction of the electrical conductive layer,
the electrical conductive layer comprising voids of which the length in the surface direction is four times or more than the length in the thickness direction accounting for at least 50% of all of the voids in the electrical conductive layer.

8. The ceramic electronic component according to claim 1, wherein the electrical conductive layer comprises metal oxide portions, the metal oxide portions being disposed at positions inside the voids or being in contact with the voids.

9. The ceramic electronic component according to claim 1, wherein the electrical conductive layer comprises:
a base layer formed on the element body and connected to the internal electrodes, the base layer containing a conductor; and
an innermost plating layer formed on the base layer, the innermost plating layer comprising an outer side and an inner side, the outer side of the innermost plating layer being farther from the element body than the inner side of the innermost plating layer, the outer side of the innermost plating layer comprising more voids than the inner side of the innermost plating layer.

10. The ceramic electronic component according to claim 9, wherein a main component of a material of the innermost plating layer is a metal selected from Cu, Fe, Zn, Sn, Pb, and Cr, or an alloy containing at least a metal selected from Cu, Fe, Zn, Sn, Pb, and Cr.

11. The ceramic electronic component according to claim 10, wherein the main component of the material of the innermost plating layer is Cu.

12. The ceramic electronic component according to claim 11, wherein a main component of a material of the base layer of each of the external electrodes is Ni,
each of the external electrodes comprising:
a Ni plating layer formed outside the innermost plating layer and containing Ni; and
a Sn plating layer formed on the Ni plating layer and containing Sn.

13. The ceramic electronic component according to claim 1, wherein the electrical conductive layer comprises a base layer formed on the element body and connected to the internal electrodes,
the base layer comprising an outer side and an inner side, the outer side of the base layer being farther from the element body than the inner side of the base layer, the outer side of the base layer comprising more voids than the inner side of the base layer.

14. The ceramic electronic component according to claim 13, wherein a main component of a material of the base layer of each of the external electrodes is Cu, each of the external electrodes comprising:
a Ni plating layer formed outside the base layer and containing Ni; and
a Sn plating layer formed on the Ni plating layer and containing Sn.

15. The ceramic electronic component according to claim 1, wherein each of the external electrodes further comprises an electrical conductive resin layer formed on the electrical conductive layer.

16. The ceramic electronic component according to claim 15, wherein the electrical conductive layer comprises:
a base layer formed on the element body and connected to the internal electrodes, the base layer including Ni; and
a Cu plating layer formed on the base layer, the Cu plating layer comprising an outer side and an inner side, the outer side of the Cu plating layer being farther from the element body than the inner side of the Cu plating layer, the outer side of the Cu plating layer comprising more voids than the inner side of the Cu plating layer,
each of the external electrodes comprising:
a Ni plating layer formed on the electrical conductive resin layer and containing Ni; and
a Sn plating layer formed on the Ni plating layer and containing Sn.

17. The ceramic electronic component according to claim 15, wherein the electrical conductive layer comprises:
a base layer formed on the element body and connected to the internal electrodes, the base layer containing Cu, the base layer comprising an outer side and an inner side, the outer side of the base layer being farther from the element body than the inner side of the base layer, the outer side of the base layer comprising more voids than the inner side of the base layer,
each of the external electrodes comprising:
a Ni plating layer formed on the electrical conductive resin layer and containing Ni; and
a Sn plating layer formed on the Ni plating layer and containing Sn.

18. A circuit board arrangement comprising:
a circuit board; and
the ceramic electronic component according to claim 1 mounted on the circuit board, the ceramic electronic component being connected to the circuit board via solder layers adhered to the external electrodes.

19. The ceramic electronic component according to claim 1, wherein the voids are formed by removing at least part of metal oxide portions in the electrical conductive layers.

20. A method of manufacturing an electronic component, the method comprising:
forming an element body that includes a dielectric and internal electrodes;
forming electrical conductive layers of external electrodes on the element body, the electrical conductive layers being connected to the internal electrodes, each of the electrical conductive layers comprising an outer side and an inner side, the outer side being farther from the element body than the inner side, the outer side comprising more voids than the inner side, the voids having at least partial empty space; and
forming a plating layer containing Ni outside each of the electrical conductive layers.

21. The method according to claim 20, wherein the forming the electrical conductive layers comprises:
applying a base material for external electrodes to multiple surfaces of the element body, the base material containing a metal;
sintering the base material to form base layers forming the electrical conductive layers of the external electrodes, each of the base layers comprising an outer side and an inner side;
oxidizing the metal of the base layers to form metal oxide portions in the base layers in such a manner that the outer side of each of the base layers are exposed to an oxidizing atmosphere, so that the outer side comprises more metal oxide portions than the inner side; and
forming voids in the base layers by removing metal oxide from the metal oxide portions.

22. The method according to claim 20, wherein the forming the electrical conductive layers comprises:
forming base layers of the electrical conductive layers of the external electrodes;
forming innermost plating layers on the base layers, the innermost plating layers containing a metal, each of the innermost plating layers comprising an outer side and an inner side;
oxidizing the metal of the innermost plating layers to form metal oxide portions in the innermost plating layers in such a manner that the outer side of each of the innermost plating layers are exposed to an oxidizing atmosphere, so that the outer side comprises more metal oxide portions than the inner side; and
forming voids in the innermost plating layers by removing metal oxide from the metal oxide portions.

* * * * *